(12) United States Patent
Muraoka et al.

(10) Patent No.: US 7,136,049 B2
(45) Date of Patent: Nov. 14, 2006

(54) INPUT APPARATUS

(75) Inventors: Tooru Muraoka, Shinagawa (JP);
Shozo Furukawa, Shinagawa (JP);
Yutaka Ueno, Shinagawa (JP);
Mitsuaki Nakazawa, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 292 days.

(21) Appl. No.: 10/389,991

(22) Filed: Mar. 18, 2003

(65) Prior Publication Data
US 2004/0027340 A1 Feb. 12, 2004

(30) Foreign Application Priority Data
Aug. 8, 2002 (JP) .............................. 2002-230893

(51) Int. Cl.
*G09G 5/00* (2006.01)
(52) U.S. Cl. ..................................... 345/173; 345/174
(58) Field of Classification Search ................ 345/173, 345/174
See application file for complete search history.

(56) References Cited

U.S. PATENT DOCUMENTS

| | | | | |
|---|---|---|---|---|
| 3,757,322 A | * | 9/1973 | Barkan et al. | ............... 345/174 |
| 4,833,279 A | * | 5/1989 | Chen et al. | ............... 178/20.02 |
| 5,181,030 A | * | 1/1993 | Itaya et al. | ................... 341/20 |

\* cited by examiner

*Primary Examiner*—Sumati Lefkowitz
*Assistant Examiner*—Ke Xiao
(74) *Attorney, Agent, or Firm*—Staas & Halsey LLP

(57) ABSTRACT

An input apparatus of the resistive type that is thinner and more durable is provided. The apparatus includes a first substrate having a conductive film on which a plurality of slits are formed in stripes, and a second substrate spaced apart from the first substrate at a fixed distance to face the surface of the first substrate implementing the conductive film. This second substrate has a conductive film formed on the surface facing the conductive film of the first substrate. A driving voltage is applied between two predetermined points on the conductive film formed on the first substrate. An electric potential of the conductive film formed on the second substrate is detected when the two conductive films come into contact.

6 Claims, 26 Drawing Sheets

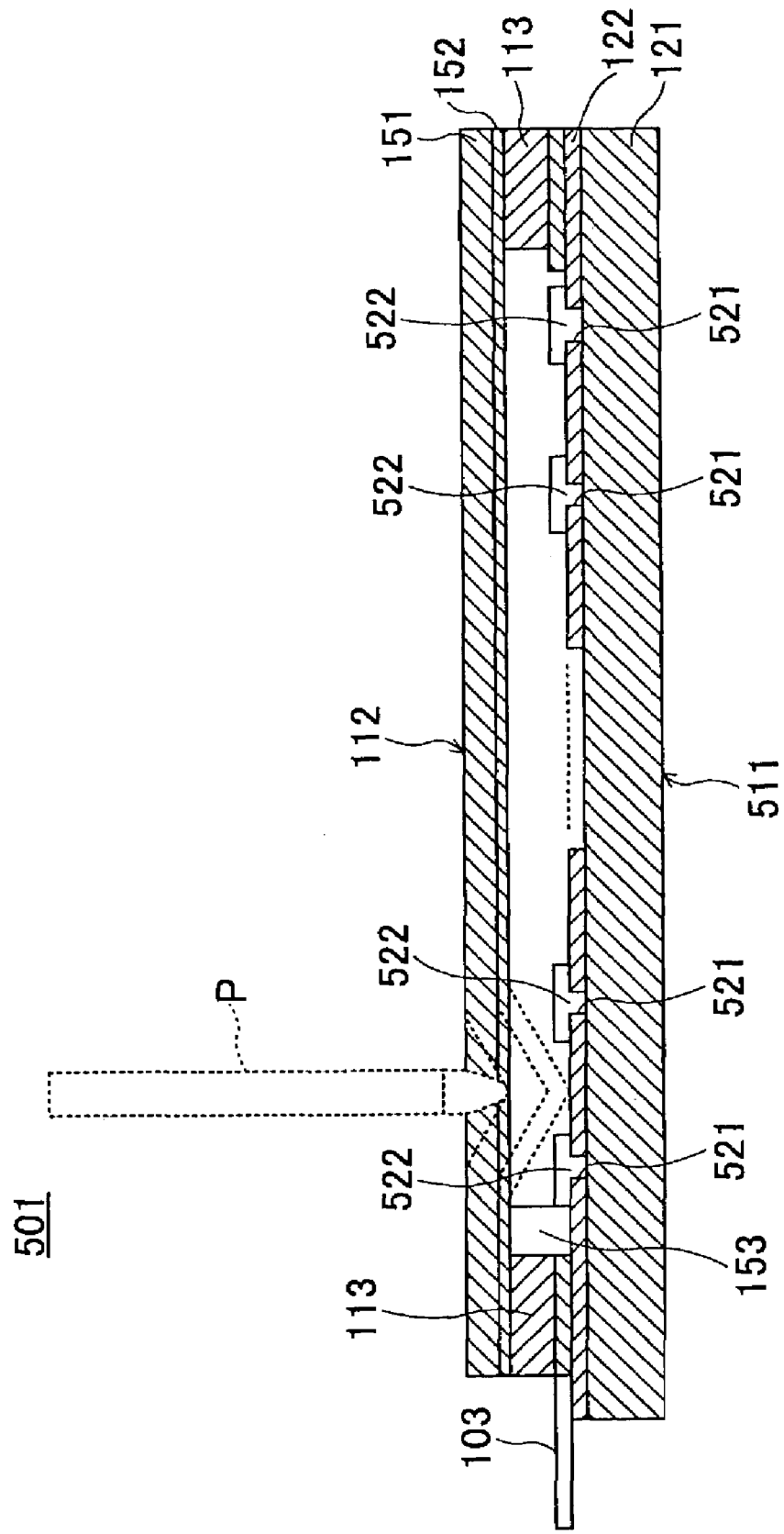

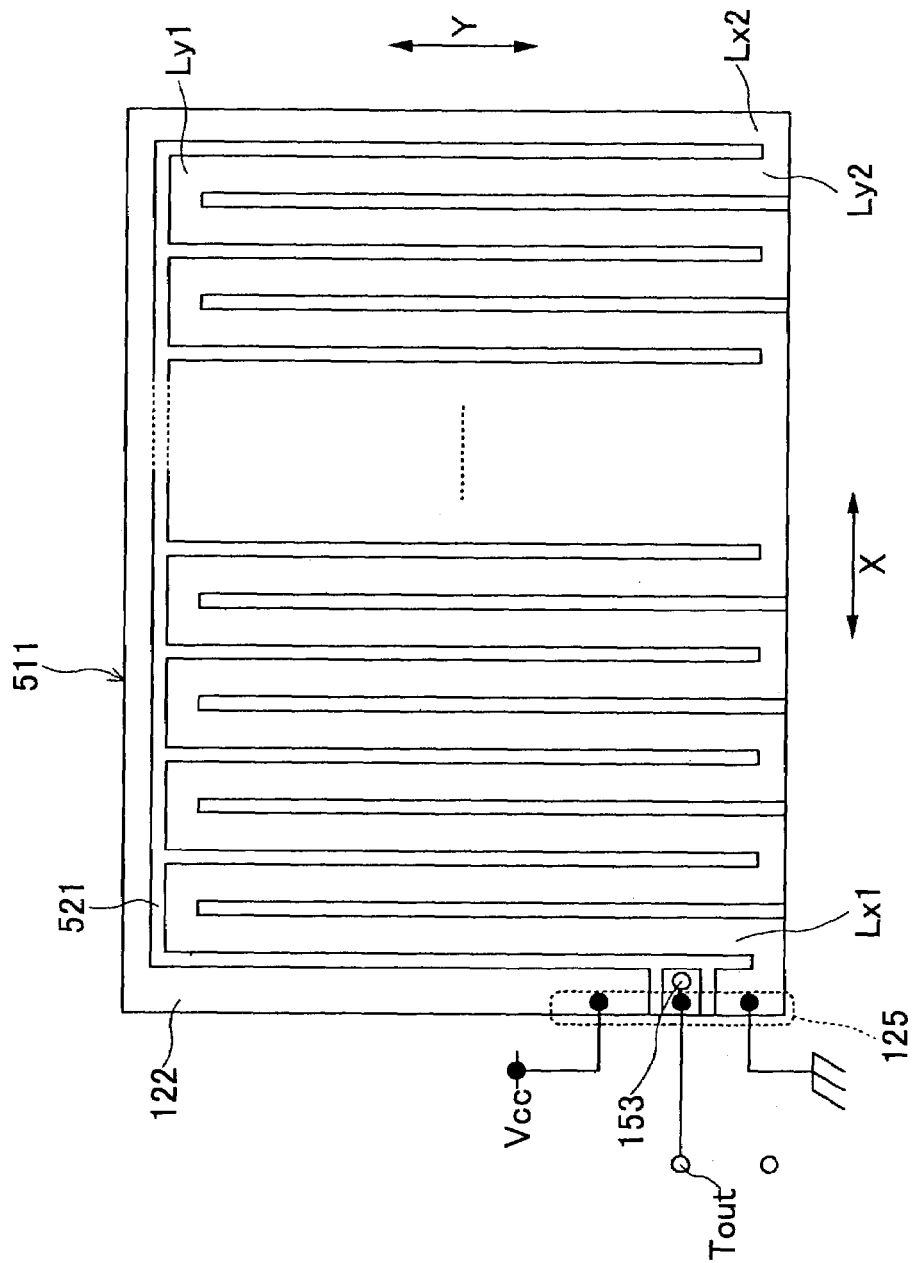

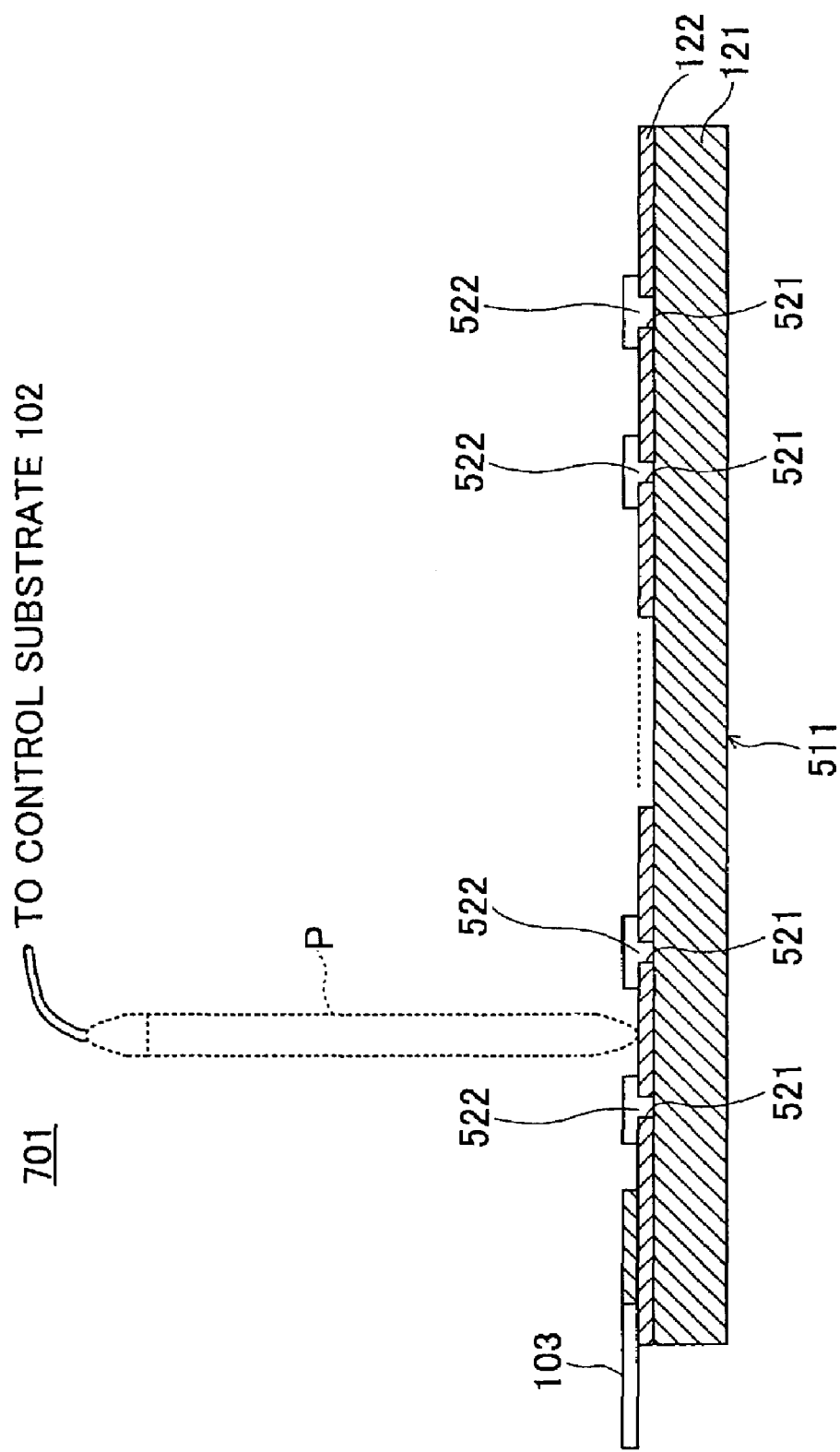

INPUT APPARATUS

BACKGROUND OF THE INVENTION

1. Field of the Invention

The present invention relates to an input apparatus, and particularly to a resistive type input apparatus.

2. Description of the Related Art

In recent years and continuing, touch panel type input apparatuses are attracting much attention because of their good operability as input apparatuses of information processors. The touch panel type input apparatus is combined with a display apparatus, and since an input can be directly made towards a display shown on the display apparatus, an operation in coherence with the human senses can be realized. In such a touch panel type input apparatus, thinness and durability are in great demand.

[Configuration of the Conventional Input Apparatus]

FIG. 1 is a diagram showing an exemplary configuration of an input apparatus according to the conventional art.

A conventional input apparatus 1 includes a touch panel 11 and a control substrate 12. The touch panel 11 includes an upper substrate 21, a lower substrate 22, and a spacer 23 placed in between the two substrates 21 and 22.

The upper substrate 21 has a film substrate 31, a transparent conductive film 32 made of ITO (indium tin oxide), for example, that is formed on the film substrate 31, and low resistance conductive patterns 33 and 34 formed parallel to each other on the transparent conductive film 32 at the two edges of the transparent conductive film 32 with respect to directions Y (Y1 and Y2).

The lower substrate 22 has a glass substrate 41, a transparent conductive film 42 made of ITO, for example, that is formed on the film substrate 41, and low resistance conductive patterns 43 and 44 formed parallel to each other on the transparent conductive film 42 at the two edges of the transparent conductive film 42 with respect to directions X (X1 and X2).

The low resistance conductive patterns 33 and 34 of the upper substrate 21 are connected to low resistance conductive patterns 45 and 46 that are arranged on the lower substrate 22. The low resistance conductive patterns 45 and 46 are connected to the control substrate 12 via a flexible printed wiring board 61. The low resistance conductive patterns 43 and 44 formed on the lower substrate 22 are also connected to the control substrate 12 via the flexible printed wiring board 61.

[Coordinates Detection Operation]

In a coordinates detection operation, first, the control substrate 12 applies a driving voltage between the conductive patterns 33 and 34 formed on the upper substrate 21, and detects the electrical potential of either conductive patterns 43 or 44 formed on the lower substrate 22. In this way, a coordinate in the directions Y can be detected.

Next, the control substrate 12 applies a driving voltage between the conductive patterns 43 and 44 formed on the lower substrate 22, and detects the electrical potential of either conductive patterns 33 or 34 formed on the upper substrate 21. In this way, a coordinate in the directions X can be detected.

In the conventional input apparatus 1, the above operations are alternately performed to detect the x and y coordinates.

However, in the conventional input apparatus, the patterns are formed by printing silver onto the transparent conductive films on the glass substrate and the film substrate. Thereby, gradation and migration are generated and this prevents the realization of a thinner input apparatus.

Also, since in this type of input apparatus, the input operation is performed by deforming the film substrate, the film substrate or the transparent conductive film is easily damaged. Further, in the conventional input apparatus, the coordinates of the directions X are detected from the resistance value of the film substrate. Therefore, even the slightest damage such as a minor scratch on the film substrate or the transparent conductive film can be a detriment to the accurate detection of the coordinates. Thus, there is a need for improvement in the durability of the input apparatus.

SUMMARY OF THE INVENTION

The present invention has been developed in response to the above mentioned problems of the related art and its object is to provide an input apparatus that is thinner and has improved durability.

An input apparatus according to the present invention includes:

a first substrate having a conductive film on which a plurality of slits are formed into stripes; and potential detection means that detects an electrical potential of the conductive film.

The above potential detection means may include:

a second substrate spaced apart from the first substrate at a fixed distance to face a surface of the first substrate implementing the conductive film, the second substrate having a conductive film formed on a surface facing the conductive film of the first substrate.

Alternatively, the above potential detection means may include a pointing member that is arranged to touch the conductive film formed on the first substrate.

Further, an input apparatus according to the present invention may include:

a first substrate having a conductive film that is divided into a first conductive film and a second conductive film, the first and second conductive films being isolated from each other by a slit; and a second substrate spaced apart from the first substrate at a fixed distance to face a surface of the first substrate implementing the conductive film, this second substrate having a conductive film formed on a surface facing the conductive film of the first substrate.

Alternatively, an input apparatus according to the present invention may include:

a substrate having a conductive film that is divided into a first conductive film and a second conductive film, the first and second conductive films being isolated from each other by a slit; and a pointing member that touches the conductive film formed on the substrate.

Further, an input apparatus according to the present invention may include:

a first substrate having a conductive film that is iteratively folded at a predetermined length to form a continuous pattern;

a second substrate having a surface on which a conductive film is evenly formed, this surface of the second substrate with the conductive film facing the first substrate; and a detector that applies a predetermined voltage to two ends of the continuous pattern formed on the first substrate, detects a voltage of the second substrate when the conductive film of the first substrate and the conductive film of the second substrate come into contact, and determines a contact position between the first substrate and the second substrate according to the detected voltage.

Alternatively, an input apparatus according to the present invention may include:

a substrate having a conductive film that is iteratively folded at a predetermined length to form a continuous pattern;

a pointing member that touches the conductive film of the substrate and detects a voltage of the conductive film; and a detector that that applies a predetermined voltage to two points of the continuous pattern formed on the substrate, detects a voltage of the pointing member, and determines a contact position between the pointing member and the substrate according to the detected voltage.

BRIEF DESCRIPTION OF THE DRAWINGS

FIG. 20 is a cross sectional view of the input apparatus according to the fifth embodiment of the present invention;

FIG. 21 is a diagram showing a structure of a lower substrate according to the fifth embodiment;

FIG. 26 is a cross sectional view of the input apparatus according to the seventh embodiment.

DESCRIPTION OF THE PREFERRED EMBODIMENTS

In the following, preferred embodiments of the present invention are described with reference to the accompanying drawings.

[Input Apparatus 100]

Figure 1:
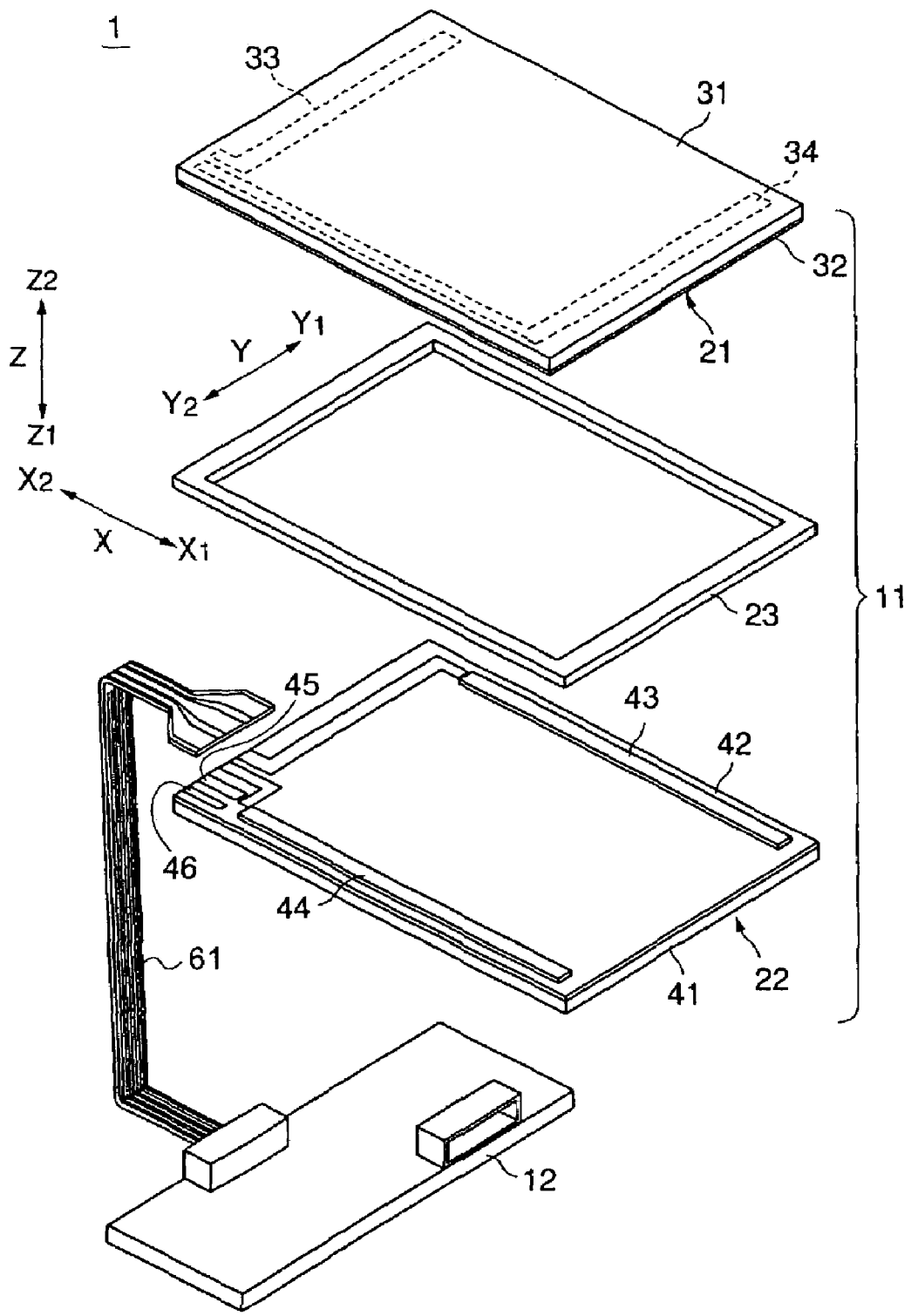
FIG. 1 is a diagram showing a configuration of an input apparatus according to the prior art.
Figure 2:
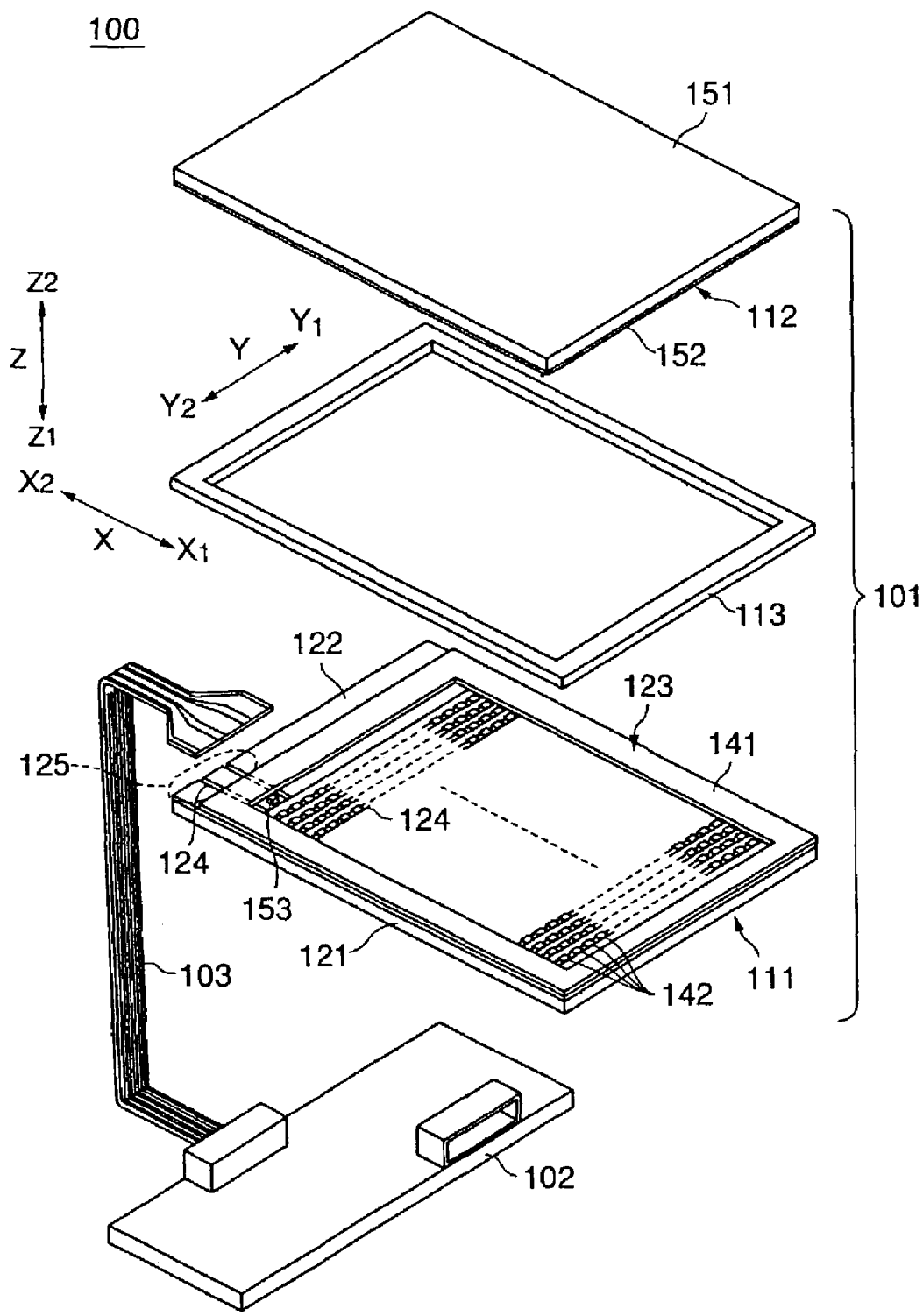
FIG. 2 is a perspective view diagram showing the component parts of an input apparatus according to a first embodiment of the present invention.

FIG. 2 is a perspective view diagram showing the component parts of an input apparatus 100 according to a first embodiment of the present invention.

The input apparatus 100 has a touch panel 101 and a control substrate 102 that are connected by a flexible printed wiring board 103.

[Touch Panel 101]

Figure 3:
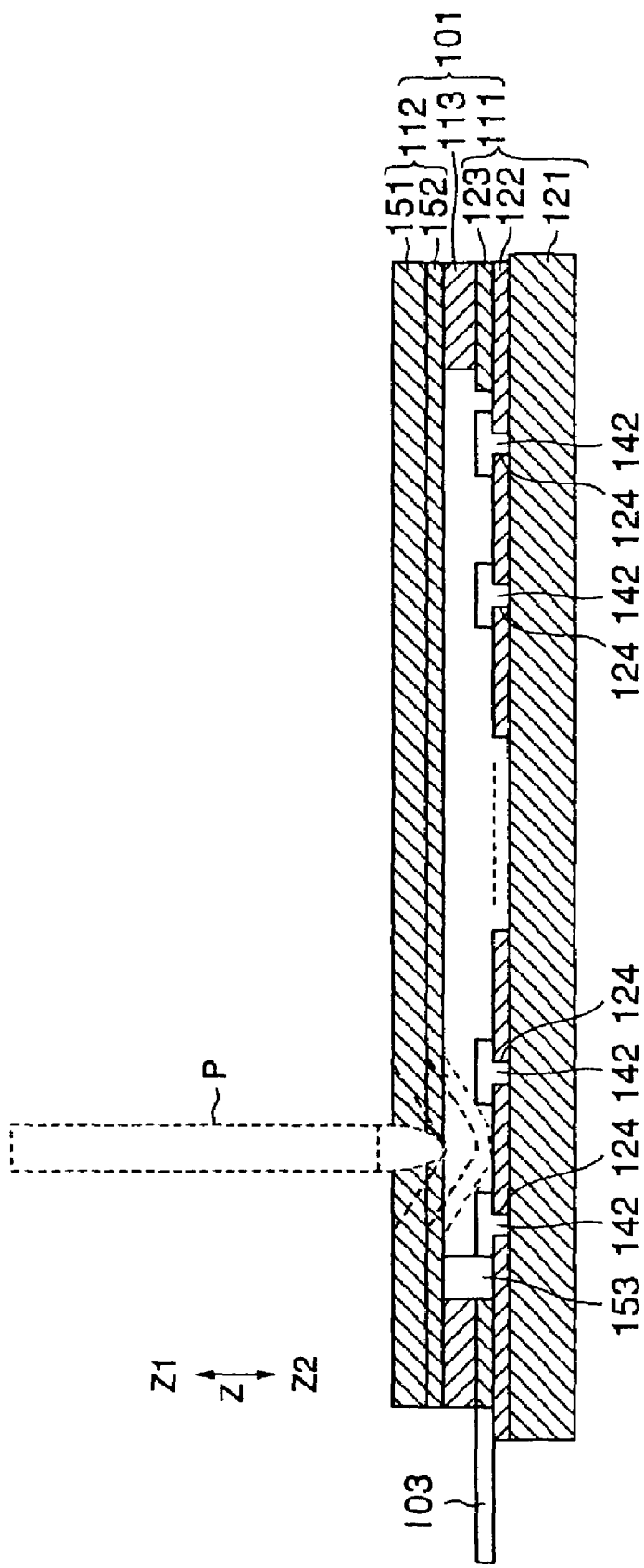
FIG. 3 is a cross sectional view of a touch panel according to the first embodiment.

FIG. 3 shows a cross sectional view of the touch panel 101.

The touch panel 101 has a lower substrate 111, an upper substrate 112, and a spacer 113 placed between the two substrates 111 and 112.

[Lower Substrate 111]

The lower substrate 111 has a transparent conductive film 122 and an insulating film 123 formed on the surface of a glass substrate 121 facing the upper substrate 112.

[Transparent Conductive Film 122]

The transparent conductive film 122 is made of transparent conductive material such as ITO (indium tin oxide) and is formed on the glass substrate 121. Also, slits 124 and a connecting portion 125 are formed on the transparent conductive film 122.

[Slits 124]

Figure 4:
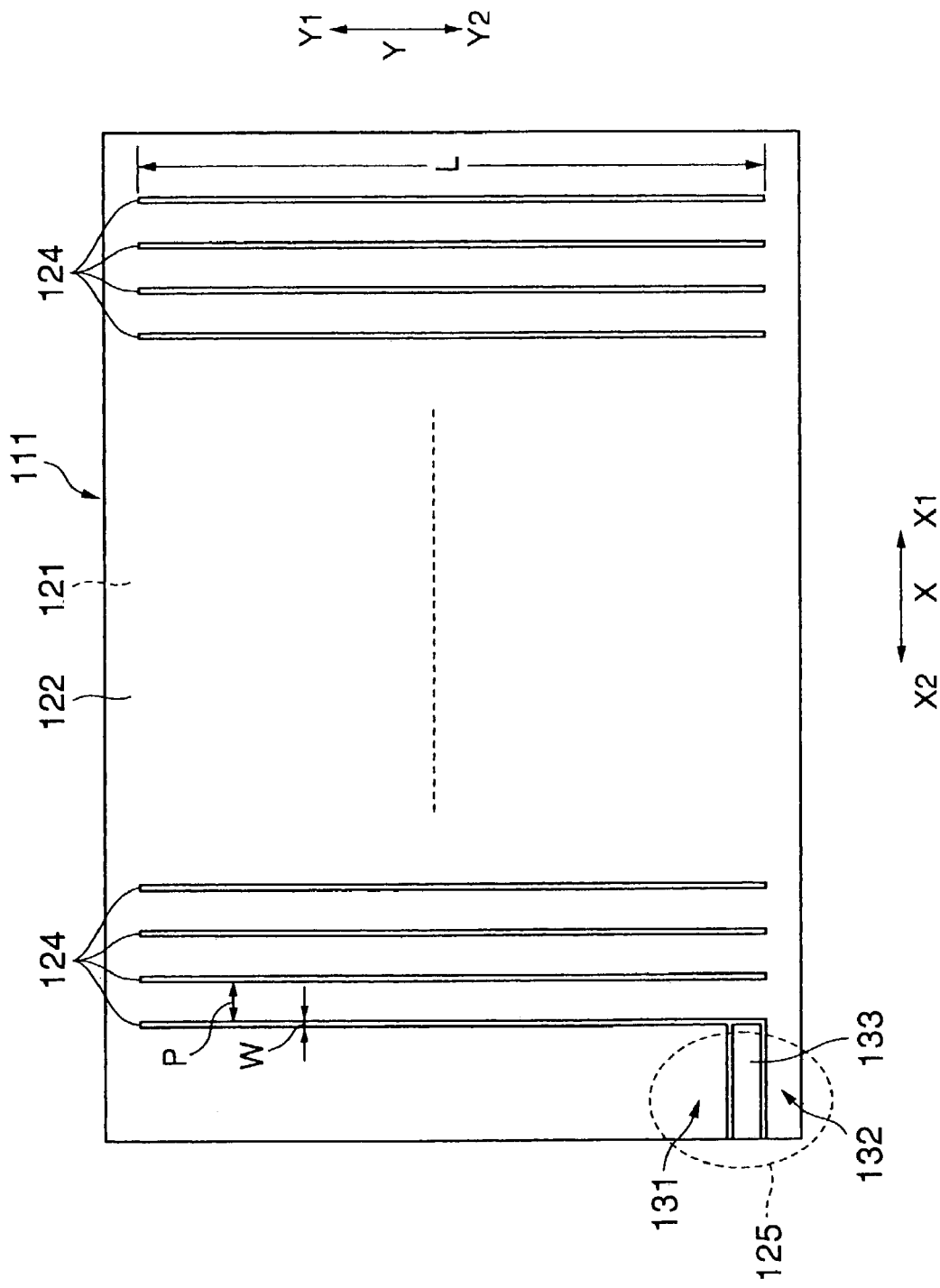
FIG. 4 is a diagram showing the formation of slits in the input apparatus according to the first embodiment.

FIG. 4 is a diagram illustrating the configuration of the slits 124.

The slit 124 extends in the directions Y at a length of L with a width w and pitch p, and a plurality of these slits 124 are arranged on the transparent conductive film 122. In this example, the width w of the slit 124 is set to approximately 0.3 mm, the pitch p is 1.3 mm, and the length L corresponds to the input range in the directions Y. Also, the number of slits 124 corresponds to the input range in the directions X. That is, the slits 124 are formed throughout the entire input range of the input apparatus.

The slits 124 may be formed, for example, through laser etching. In laser etching, a laser beam is oscillated into a pulsed state according to the pattern, the object of the laser beam or the etching, in this case, the glass substrate 123 is moved, and irradiated so as to be etched. In this method, the diameter of the laser spot determines the width of the slit formed by one etching. Herein, the light source used may be, for example, YAG (yttrium aluminum garnet) laser, excimer laser, CO2 laser, etc.

The diameter of the laser spot can be adjusted by adjusting the focus of the laser beam. In this embodiment, the width of the slit 124 is 0.3 mm and thus, the diameter of the laser spot is adjusted to be 0.3 mm.

Note that the formation of the slits 124 is not limited to the laser etching method; rather, other etching methods such as chemical etching may also be used.

Also, the slits 124 need not be straight lines; rather, they may also be nonlinear.

Figure 5:
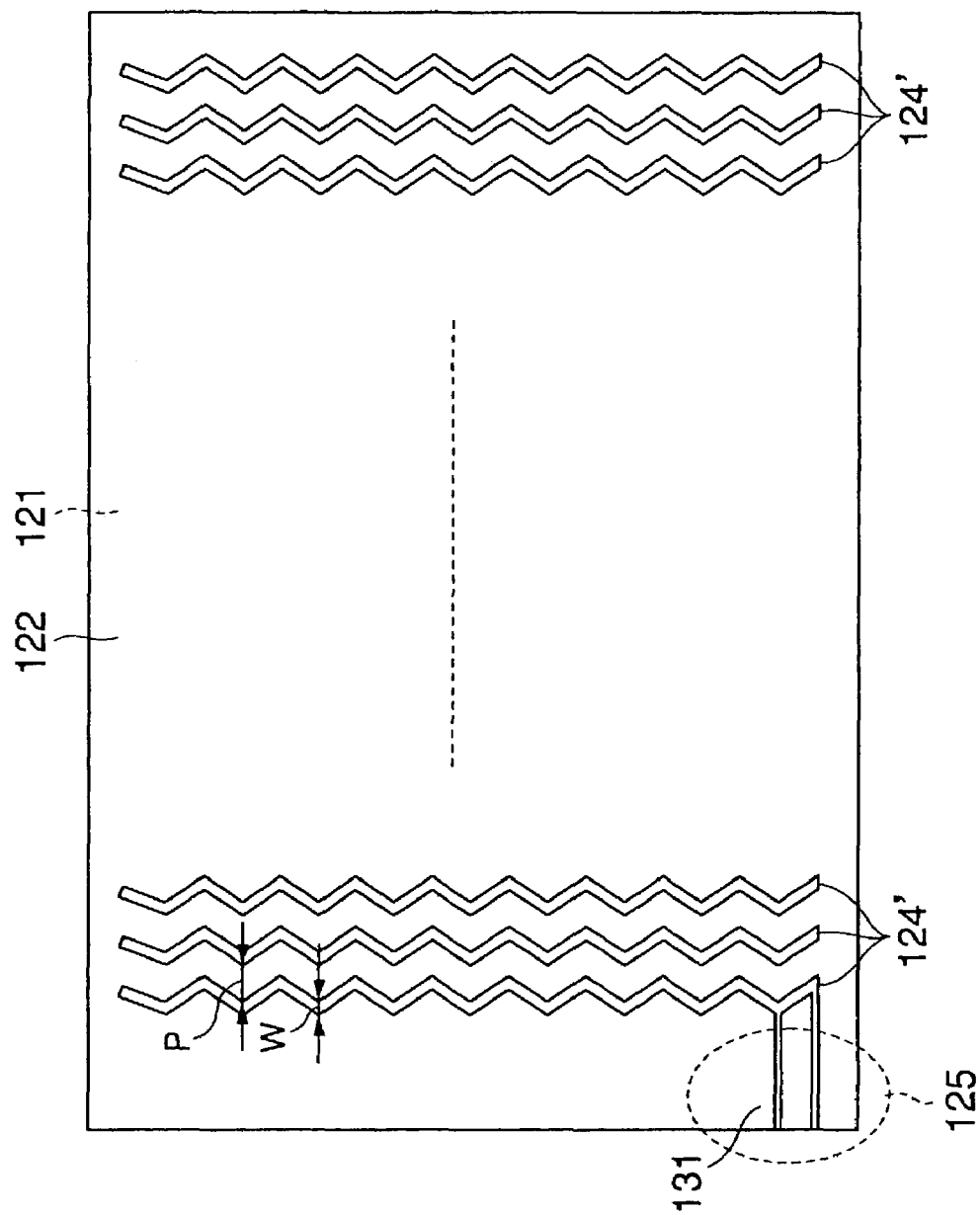
FIG. 5 is a diagram showing a modification of the formation of slits in the input apparatus according to the first embodiment.

FIG. 5 is a diagram showing an exemplary modification of the slits 124.

In this modification, slits 124' are formed into zigzagged lines. The cycle of the zigzagging of the slits 124' is arranged to be in accordance with the display of the display apparatus implemented below the input apparatus 100 so that moire fringes are not generated due to interference with the display.

Further, the shape of the slits 124' is not limited to zigzag lines; they may also be wave-shaped or any other shape that will not cause interference with the display of the display apparatus implemented under the input apparatus 100 and can avoid the generation of moire fringes.

[Connecting Portion 125]

The connecting portion 125 has a driving terminal 131, a grounding terminal 132, and an output terminal 133 (see FIG. 4). The driving terminal 131, the grounding terminal 132 and the output terminal 133 are a part of the transparent conductive film 122 and are arranged at the end portion of the conductive film 122 with respect to the direction X2 and the direction Y2.

The driving terminal 131 is a terminal for applying a driving voltage and is arranged to be isolated from the grounding terminal 132 and the output terminal 133 by the slits 124. The grounding terminal 132 is connected to the grounding and is isolated from the driving terminal 131 and the output terminal 133 by the slits 124. The output terminal 133 is a terminal for enabling connection with the upper substrate 112 and is arranged in between the driving terminal 131 and the grounding terminal 132. The output terminal 133 is arranged to be isolated from the driving terminal 131 and the grounding terminal 132 by the slits 124. The slits 124 are arranged so that the driving terminal 131 and the grounding terminal 132 are connected by the conductive film 122 formed around the slits 124, and the output terminal 133 is isolated from the surrounding conductive film 122.

The driving terminal 131, the grounding terminal 132, and the output terminal 133 are connected to the control substrate 102 via the flexible printed wiring board 103.

[Insulating Film 123]

The insulating film 123 has a periphery portion 141 and dot spacers 142 (see FIGS. 2 and 3). The periphery portion 141 is formed on the non-input regions at the rim portions of the conductive film 122. The periphery portion 141 prevents unnecessary contact with the upper substrate 112. The dot spacers 142 are formed on the slits 124 and are for controlling the flexibility (warping) of the upper substrate 112. Specifically, when the upper substrate 112 is pressed, the dot spacers 142 prevent the pressed point from spreading across the slits 124 to come into contact with adjacent conductive film 122 portions. In other words, the dot spacers are means for controlling the contact of the upper substrate 112 to the lower substrate 111.

[Upper Substrate 112]

The upper substrate 112 has a film substrate 151 and a transparent conductive film 152 (see FIGS. 2 and 3).

The film substrate 151 may be, for example, PET (polyethylene telephtalete) molded into a film and is provided with flexibility. The transparent conductive film 152 is made of transparent conductive material such as ITO and is evenly formed on the entire surface of the film substrate 151 facing the lower substrate 111. The transparent conductive film 152 is connected to the output terminal 133 arranged on the lower substrate 111 via a contact point member 153.

[Spacer 113]

The spacer 113 is made of insulating material and maintains a fixed space between the lower substrate 111 and the upper substrate 112. When the upper substrate 112 is not pressed, the spacer 113 keeps the conductive film 122 of the lower substrate 111 isolated from the conductive film 152 of the upper substrate 112. When the upper substrate 112 is pressed in a direction Z1, the upper substrate 112 is deformed and the conductive film 152 of the upper substrate 112 comes into contact with the conductive film 122 of the lower substrate 111.

[Control Substrate 102]

Figure 6:
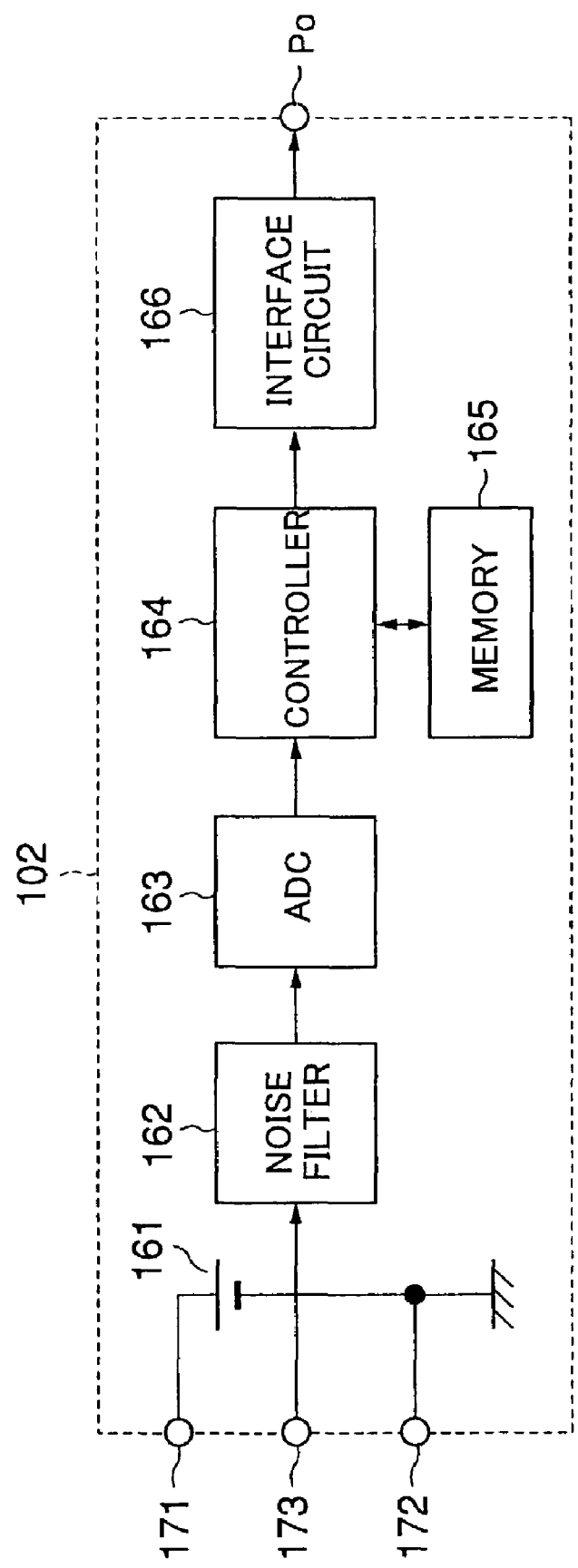
FIG. 6 is a block diagram of a control substrate according to an embodiment of the present invention.

FIG. 6 is a block diagram of the control substrate 102.

The control substrate 102 has a driving power source 161, a noise filter 162, an analog-to-digital converter 163, a controller 164, a memory 165, and an interface circuit 166. Also, a driving voltage supply terminal 171, a grounding terminal 172, an input terminal 173, and an output port Po are arranged at the control substrate 102.

The driving voltage supply terminal 171 is connected to the driving terminal 131 of the touch panel 101 via the flexible printed wiring board 103. The grounding terminal 172 is connected to the grounding terminal 132 of the touch panel 101 via the flexible printed wiring board 103. The input terminal 173 is connected to the output terminal 133 of the touch panel 101 via the flexible printed wiring board 103. The input port Po is connected to a host apparatus, which is not shown in the drawing.

A driving voltage Vd is applied to the driving voltage supply terminal 171 by the driving power source 161. The noise filter 162 removes noise components from a signal supplied from the input terminal 173. The signal filtered at the noise filter 162 is then supplied to the analog-to-digital converter 163. The analog-to-digital converter 163 converts the signal from the noise filter 162 into digital data. The digital data converted at the analog-to-digital converter 163 are supplied to the controller 164.

The controller 164 reads out coordinates data from the memory 165 based on the above digital data. The memory 165 is a nonvolatile storage device and stores coordinates data Dx and Dy that correspond to digital data Din supplied from the analog-to-digital converter 163.

The coordinates data read out from the memory 165 by the controller 164 are converted into a predetermined interface format by the interface circuit 166 and are output from the output port Po. The output port Po is connected to a host apparatus and supplies the coordinates data to the host apparatus. The host apparatus controls the position of a pointer and the like based on the coordinates data from the controller 164.

[Principle of Operation of the Input Apparatus 100]

Figure 7:
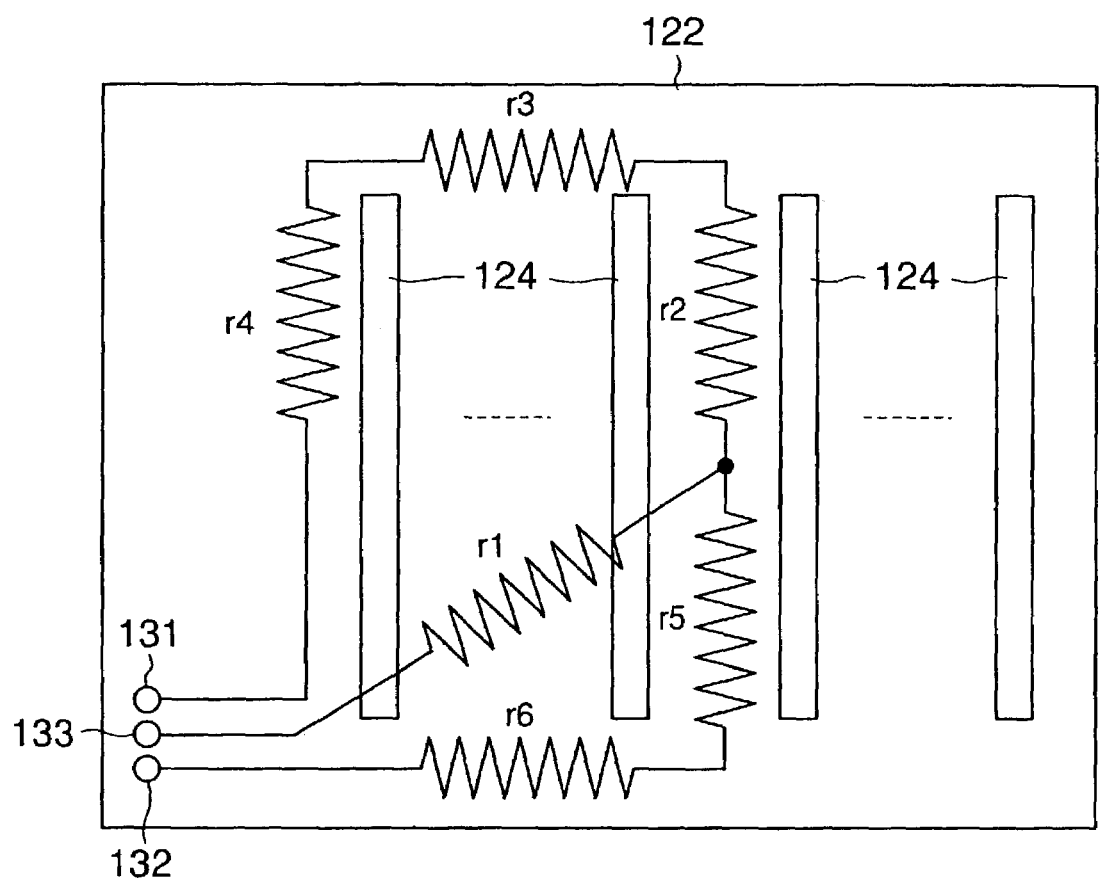
FIG. 7 is an equivalent circuit diagram of the touch panel in the input apparatus according to the first embodiment.

FIG. 7 is a circuit diagram of the touch panel 101.

FIG. 7 shows the circuit in which a contact point with coordinates (x, y) of the upper substrate 112 is pressed by a pen P.

In the following, the determination method of the coordinates (x, y) will be described.

In FIG. 7, the resistance R1 from the driving terminal 131 to the output terminal 133 via the input coordinates (x, y) can be expressed as:

$$R1 = r4 + r3 + r2 + r1 \qquad (1)$$

Also, the resistance R2 from the grounding terminal 132 to the output terminal 133 via the input coordinates (x, y) can be expressed as:

$$R2 = r6 + r5 + r1 \quad (2)$$

If the length of the slits 124 is denoted as Y0, the resistivity of the transparent conductive film 122 as ρg, and the resistivity of the transparent conductive film 152 as ρf, the resistance r4 can be expressed as:

$$r4 = Y0 \cdot \rho g \quad (3)$$

Also, the resistance r3 can be expressed as:

$$r3 = x \cdot \rho g \quad (4)$$

Also, the resistance r2 can be expressed as:

$$r2 = (Y0 - y) \cdot \rho g \quad (5)$$

Further, the resistance r1 can be expressed as:

$$r1 = \{(x^2 + y^2)^{1/2}\} \cdot \rho f \quad (6)$$

Based on formulas (3) through (6), the formula (1) can be expressed as:

$$R1 = Y0 \cdot \rho g + x \cdot \rho g + \{(Y0-y) \cdot \rho g\} + \{(x^2+y^2)^{1/2}\} \cdot \rho f = \{(x^2+y^2)^{1/2}\} \cdot \rho f + (x + 2Y0 - y) \cdot \rho g \quad (7)$$

Also, the resistance r5 can be expressed as:

$$r5 = y \cdot \rho g \quad (8)$$

And, the resistance r6 can be expressed as:

$$r6 = x \cdot \rho g \quad (9)$$

Based on the formulas (8) and (9), formula (2) can be expressed as:

$$R2 = x \cdot \rho g + y \cdot \rho g + \{(x^2+y^2)^{1/2}\} \cdot \rho f = \{(x^2+y^2)^{1/2}\} \cdot \rho f + (x+y) \cdot \rho g \quad (10)$$

Herein, formula (7) can be modified to obtain the following:

$$X = (R2/\rho g)\{2Y0 - (R1/\rho g)\}/\{2Y0 - (R1+R2)/\rho g\} + (\rho f^2 - \rho g^2)(x^2+y^2)/\{R1+R2)\rho g + 2Y0 \rho g^2\} \quad (11)$$

Also, formula (10) can be modified to be expressed as:

$$y = Y0 + (R2 - R1)/2\rho g \quad (12)$$

Herein, it is assumed that ρg=ρf to simplify the following descriptions. In turn, formula (11) can be expressed as:

$$x = (R2/\rho g)\{2Y0 - (R1/\rho g)\}/\{2Y0 - (R1+R2)/\rho g\} \quad (13)$$

Thus, the x coordinate can be expressed as formula (13) and the y coordinate can be expressed as formula (12). That is, the coordinates (x, y) can be unambiguously determined according to the resistances R1 and R2.

In formula (11), the resistivity ρf of the transparent conductive film 152 of the upper substrate 112 is arranged to be sufficiently smaller than the resistivity ρg of the transparent conductive film 122 of the lower substrate 111 (ρf<ρg). Consequently, the second term of the formula (11):

$$(\rho f^2 - \rho g^2) = (1/\rho f^2) \cdot (1 - \rho f^2/\rho g^2)$$

becomes 0, and thus, the coordinates can be determined in a similar manner as the above case where ρf=ρg. In this way the coordinates (x, y) can be unambiguously determined according to the resistances R1 and R2.

In the present embodiment, the resistances R1 and R2 are determined and the coordinates x, y are obtained by detecting the electric potential of the output terminal 133. The controller 164 is arranged to read out and output the coordinates data Dx, Dy corresponding to the digital data Din, which is the electrical potential of the output terminal 133, from the memory 165.

[Modification of the Control Substrate 102]

In the present embodiment, the driving voltage is applied to the transparent conductive film 122 of the lower substrate 111 and the voltage is detected from the transparent conductive film 152 of the upper substrate 112. However, the driving voltage can also be applied to the transparent conductive film 152 of the upper substrate 112 and the voltage can be detected from the transparent conductive film 122 of the lower substrate 111.

Figure 8:
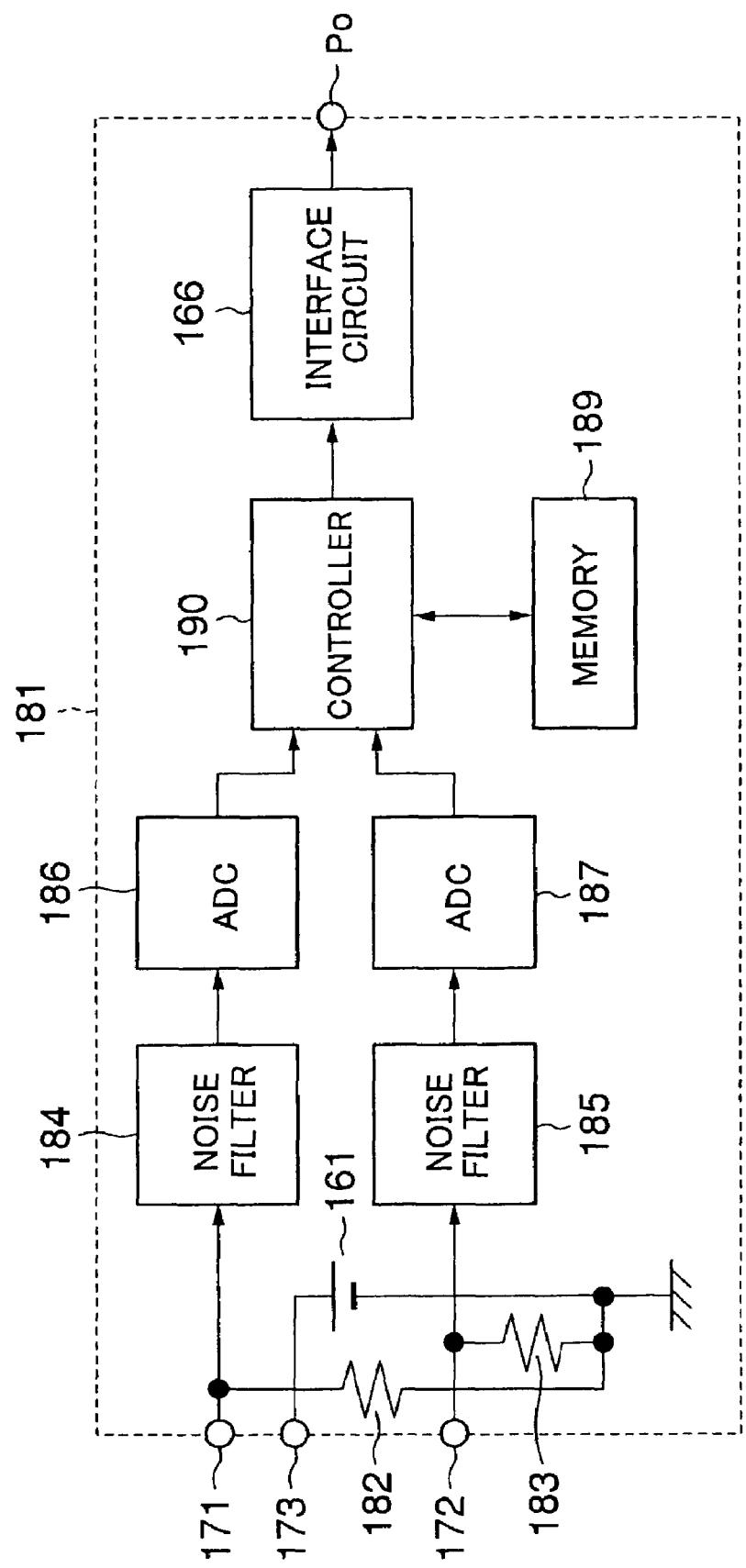
FIG. 8 is a block diagram of a modification of the control substrate.

FIG. 8 is a block diagram of an exemplary modification of the control substrate 102. In this drawing, the components that are identical to those shown in FIG. 6 are given the same numerical notations and their descriptions are omitted.

A control substrate 181 according to this modification has the driving power source 161, detection resistors 182 and 183, noise filters 184 and 185, analog-to-digital converters 186 and 187, a memory 189, a controller 190, and the interface circuit 166.

The driving power source 161 applies a driving voltage to the input terminal 173 connected to the conductive film 152 formed on the upper substrate 112. The driving terminal 171 connected to the driving terminal 131 of the lower substrate 111 is grounded via the detection resistor 182. The voltage generated at the driving terminal 171 by the detection resistor 182 is supplied to the noise filter 184. The noise filter 184 removes noise components from the voltage generated at the driving terminal 171. The voltage filtered at the noise filter 184 is then supplied to the analog-to-digital converter 186.

The analog-to-digital converter 186 converts the noise-filtered voltage from the noise filter 184 into digital data. The digital data converted at the analog-to-digital converter 186 are supplied to the controller 190.

The grounding terminal 172 connected to the grounding terminal 132 of the lower substrate 111 is grounded via the detection resistor 183. The voltage generated at the grounding terminal 172 by the detection resistor 183 is supplied to the noise filter 185. The noise filter 185 removes noise components from the voltage generated at the grounding terminal 172. The voltage noise-filtered at the noise filter 185 is supplied to the analog-to-digital converter 186.

The analog-to-digital converter 187 converts the noise-filtered voltage from the noise filter 185 into digital data. The digital data converted at the analog-to-digital converter 187 are then supplied to the controller 190.

The controller 190 determines the coordinates data Dx and Dy based on the ratio of the digital data converted at the analog-to-digital converter 186 to the digital data converted at the analog-to-digital converter 187 by referring to the memory 189.

[Effects]

According to the above first embodiment of the present invention, a parallel electrode structure due to silver ink printing becomes unnecessary, and the structure of the input apparatus can be simplified. Also, the input apparatus can be made thinner. Further, since the connecting terminal has only three terminals, namely, a power source terminal, a grounding terminal, and an output terminal, the structure of the connecting terminal can be simplified and reliability can be increased. Also, a panel with a long life expectancy can be realized.

[Second Embodiment]

Figure 9:
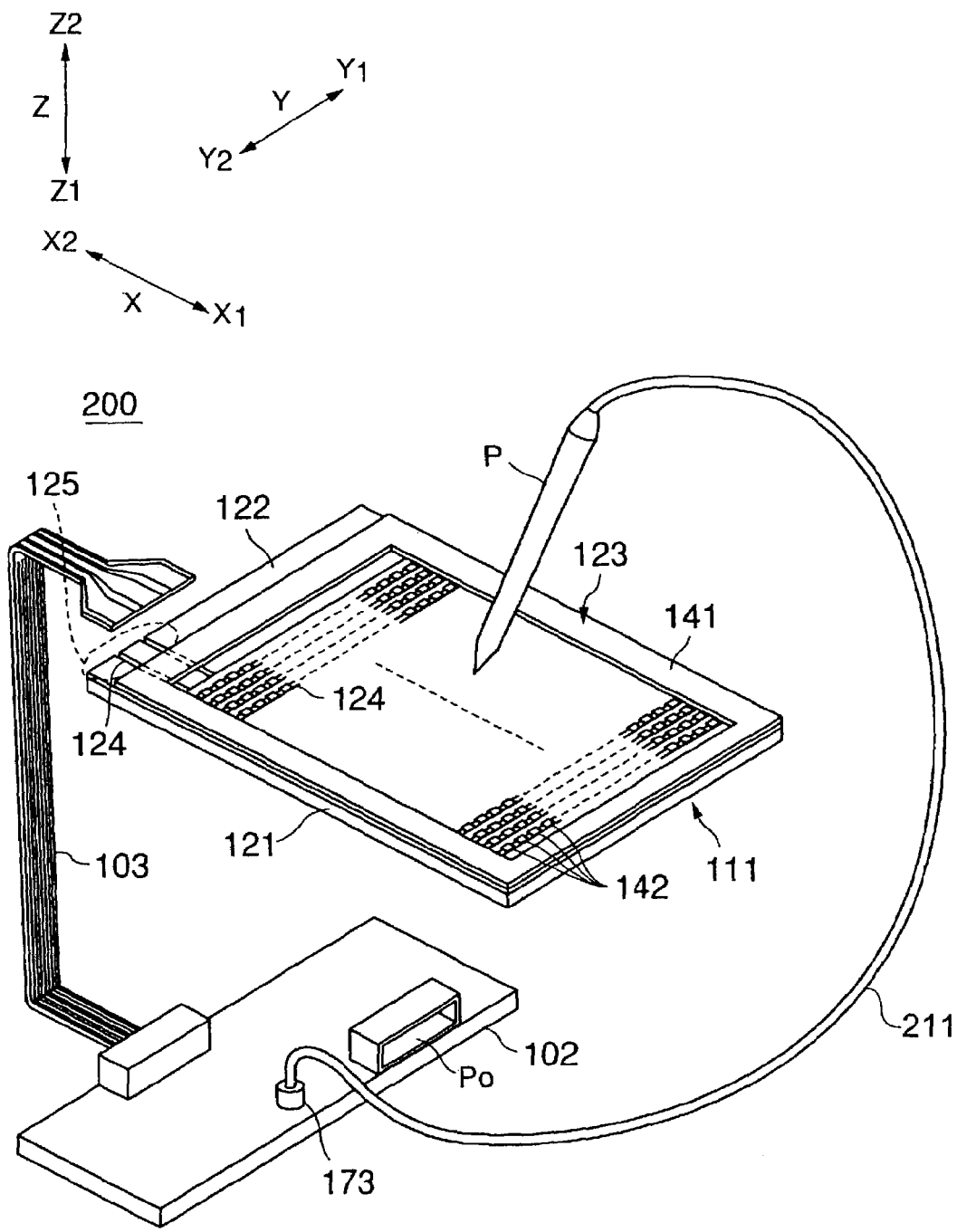
FIG. 9 is a perspective view diagram showing the component parts of an input apparatus according to a second embodiment of the present invention.
Figure 10:
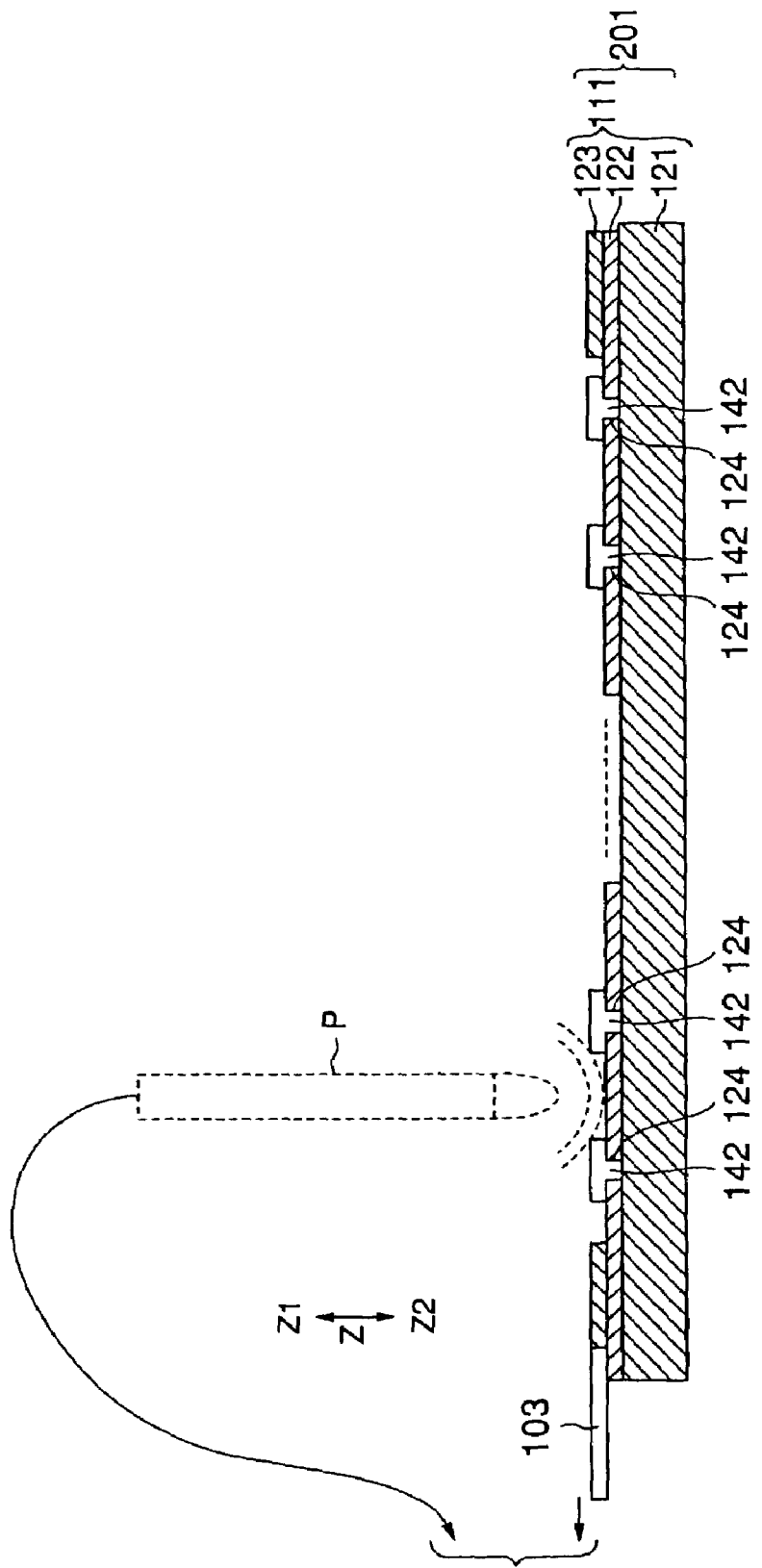
FIG. 10 is a cross sectional view of the input apparatus according to the second embodiment.

FIG. 9 is a perspective view diagram showing the component parts of an input apparatus according to a second embodiment of the present invention; and FIG. 10 is a cross sectional view of the input apparatus according to the second embodiment. In the above drawings, the components that are identical to those shown in FIGS. 2 and 3 are given the same numerical notations and their descriptions are omitted.

An input apparatus 200 according to the present embodiment has a coordinates pointing pen P for making an input instead of the upper substrate 112 of the first embodiment. Thereby, a touch panel 201 of this embodiment has a different configuration from the touch panel 101 of the first embodiment.

The touch panel 201 of the present embodiment does not include the upper substrate 112, the spacer 113 and the contact point member 153 of the touch panel 101 according to the first embodiment. In this embodiment, a coordinates pointing pen 211 is connected to the input terminal 173 of the control substrate 102 with a cable 211.

Also, the dot spacer 142 controls the position of the coordinates pointing pen P so that when the coordinates pointing pen P comes into contact with the lower substrate 111, the contact point does not spread across the slits 124 to adjacent regions of the conductive film 122.

The equivalent circuit of the touch panel 201 according to this embodiment has the same structure as that shown in FIG. 7. In the present embodiment, detection is performed in the same manner as that of the first embodiment but without using the coordinates (x, y), and the resistance r1 is either 0 or a fixed value.

Note that the slits 124 in this embodiment may also be zigzagged as shown in FIG. 5 or wave-shaped so that interference with the display of the display apparatus arranged under the input apparatus 200 can be prevented and the generation of moire fringes can be controlled.

Further, according to this embodiment, the upper substrate will be unnecessary, and thus, the input apparatus can be made even thinner.

[Third Embodiment]

Figure 11:
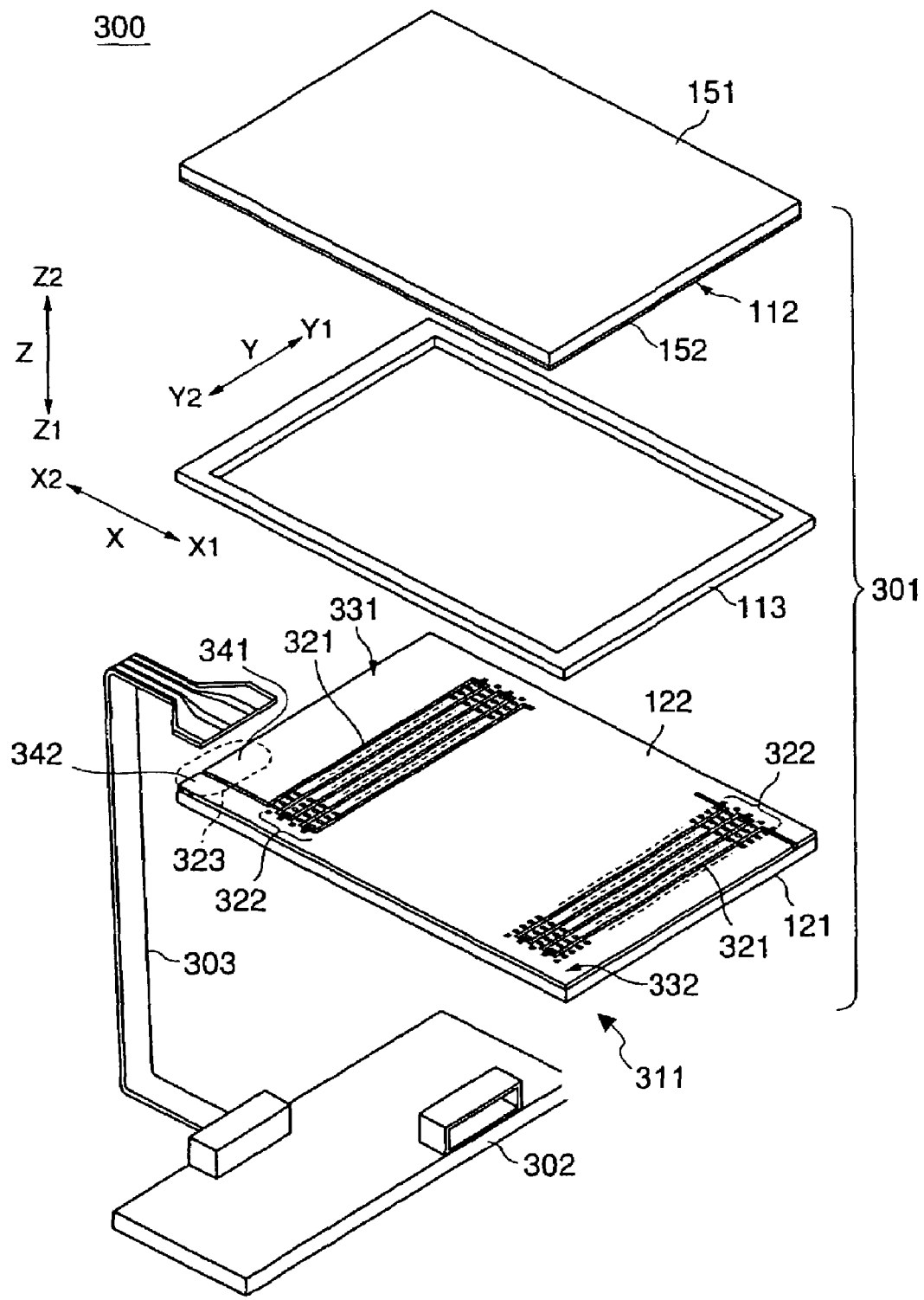
FIG. 11 is a perspective view diagram showing the component parts of an input apparatus according to a third embodiment of the present invention.
Figure 12:
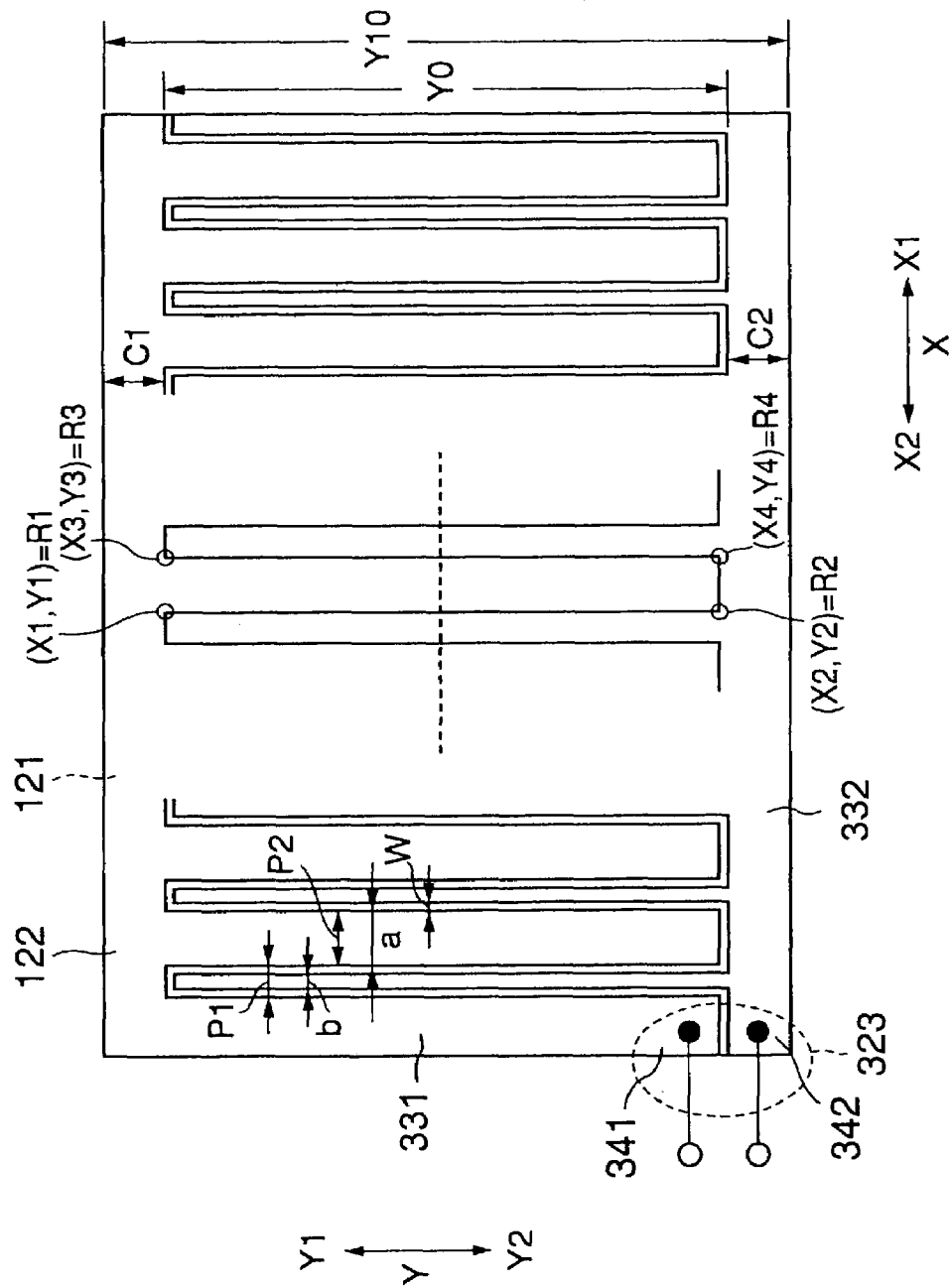
FIG. 12 is a diagram showing the formation of slits in the input apparatus according to the third embodiment.

FIG. 11 is a perspective view diagram showing the component parts of an input apparatus according to a third embodiment of the present invention; and FIG. 12 is a diagram showing the formation of slits 321 of the input apparatus according to the third embodiment. In the above drawings, components that are identical to those shown in FIGS. 2 and 3 are given the same numerical notations and their descriptions are omitted.

In an input apparatus 300 according to the present invention, a touch panel 301 and a control substrate 302 are connected via a flexible printed wiring board 303.

[Touch Panel 301]

Figure 13:
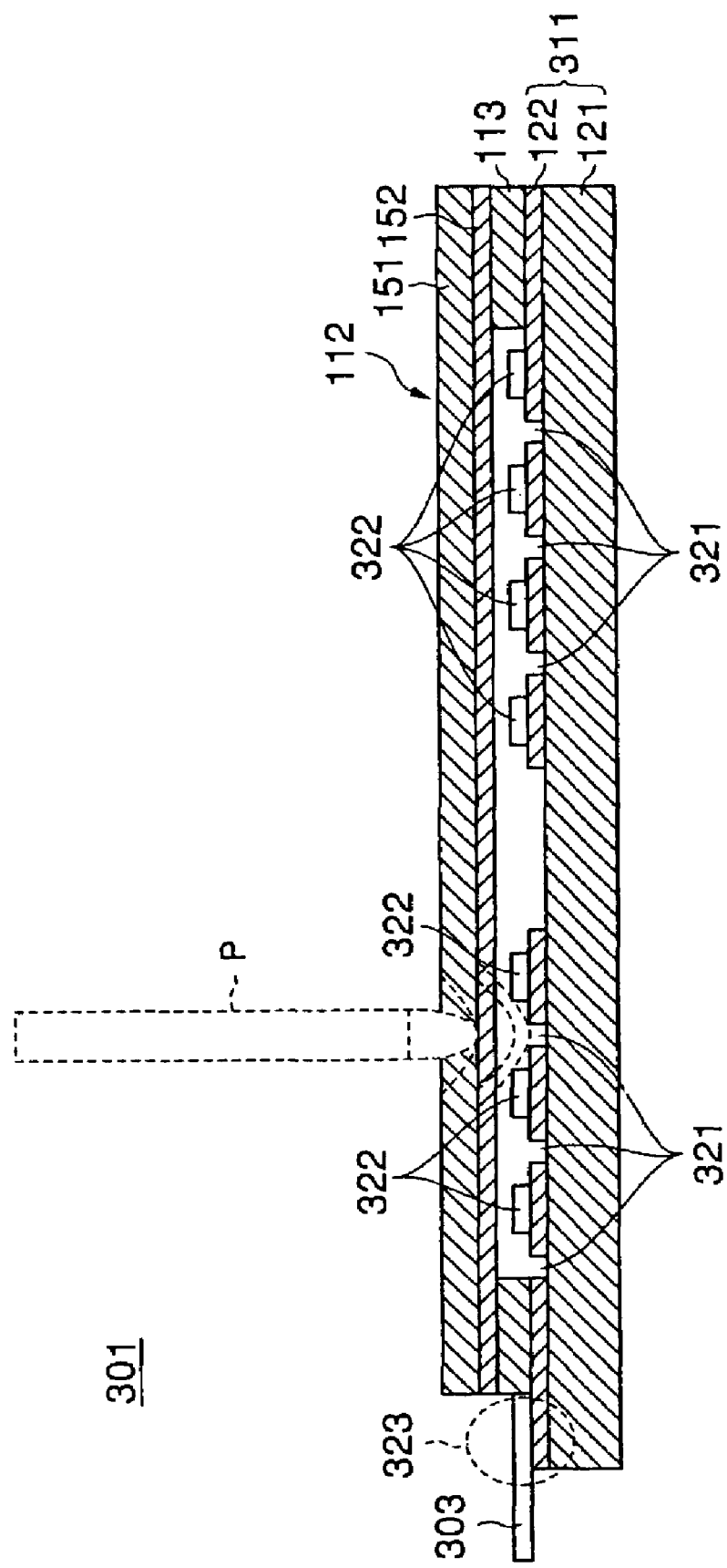
FIG. 13 is a cross sectional view of a touch panel according to the third embodiment.

FIG. 13 shows a cross sectional view of the touch panel 301.

In the touch panel 301 according to the present invention, a lower substrate 311 has a configuration that is different from the lower substrate 111 according to the first embodiment. Specifically, the formation of slits 321, the arrangement of dot spacers 322, and the structure of a connecting portion 323 are different from the first embodiment.

[Slit 321]

The slit 321 according to the present embodiment is a single continuous slit arranged to form a sequence of rectangular shapes and to divide the conductive film 122 into a first conductive film 331 and a second conductive film 332.

The slit 321 is formed using the laser etching technique, the chemical etching technique and the like as in the first embodiment.

The slit 321 is formed at a width w, and portions of this slit 321 extending in directions Y (Y1 and Y2) each of length Y0 are arranged alternately at a first pitch p1 and a second pitch p2. Herein, the width w is set to approximately 0.3 mm, the first pitch p1 to approximately 1.3 mm, and the second pitch p2 to approximately 3.3 mm. The length Y0 extending in the directions Y is determined according to the input range. According to the above setting, a width 'a' of the first conductive film 331 portion in between the extending portions of the slit 321 will be approximately 3 mm, and the width 'b' of the second conductive film 332 portion will be approximately 1 mm.

[A Modification of the Slit 321]

Figure 14:
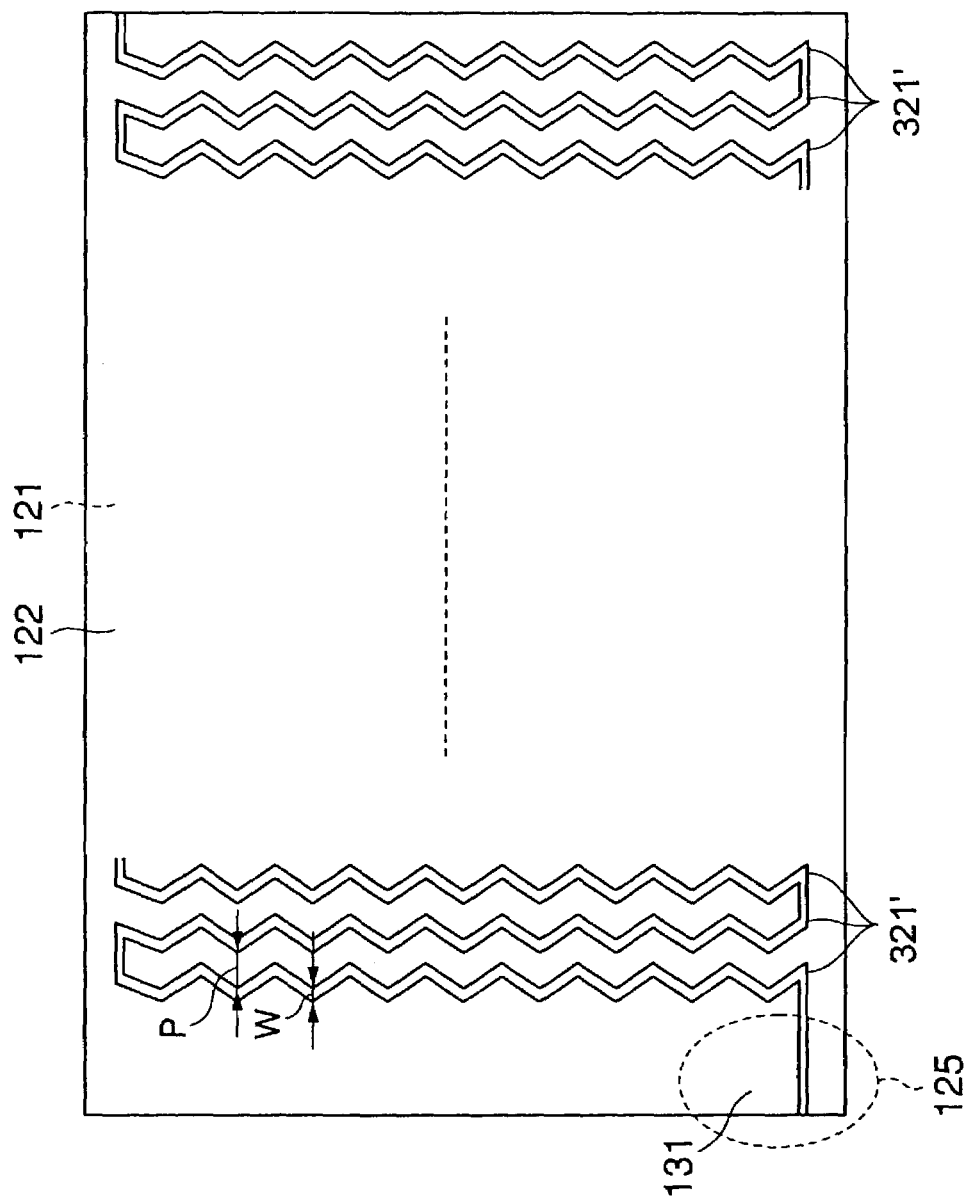
FIG. 14 is a plan view showing a modification of the slits in the input apparatus according to the third embodiment.

FIG. 14 is a plan view showing a modification of the slit 321.

A slit 321' according to this modification is arranged to be zigzagged as shown in the drawing. By using the slit 321' having a zigzagged structure, interference with the display of the display apparatus implemented under the input apparatus 300 can be prevented and the generation of moire fringes can be controlled.

The cycle of the zigzagging of the slit 321' is arranged to be one that does not interfere with the display of the display apparatus implemented under the input apparatus 300 so that moire fringes will not be generated.

Note that the slit 321' is not limited to being zigzagged; rather, the slit 321' can have a wave-shaped formation or any other structure so long as interference with the display of the display apparatus implemented under the input apparatus 300 can be prevented and the generation of moire fringes can thus be controlled.

[Dot Spacer 322]

The dot spacer 322 according to the present embodiment is formed on the first conductive film 331 and the second conductive film 332 of the conductive film 122. This dot spacer 322 is arranged so that when the upper substrate 112 is pressed, the conductive film 152 of the upper substrate 112 comes into contact with both the first conductive film 331 and the second conductive film 332 at the pressed point. Thus, this dot spacer 322 can ensure that the conductive film 152 of the upper substrate 112 touches both the first conductive film 331 and the second conductive film 332 when the upper substrate 112 is pressed.

[Connecting Portion 323]

The connecting portion 323 according to the present embodiment has a first terminal 341 and a second terminal 342. The first terminal 341 is a part of the first conductive film 331, and the second terminal 342 is a part of the second conductive film 332. These terminals are arranged at the corner portion of the conductive film 122 with respect to the directions X2 and Y2.

The first terminal 341 and the second terminal 342 are connected to the control substrate 302 via the flexible printed wiring board 303. In the present embodiment, the connecting portion 323 has only two terminals thereby further simplifying the structure of the terminal.

[Control Substrate 302]

Figure 15:
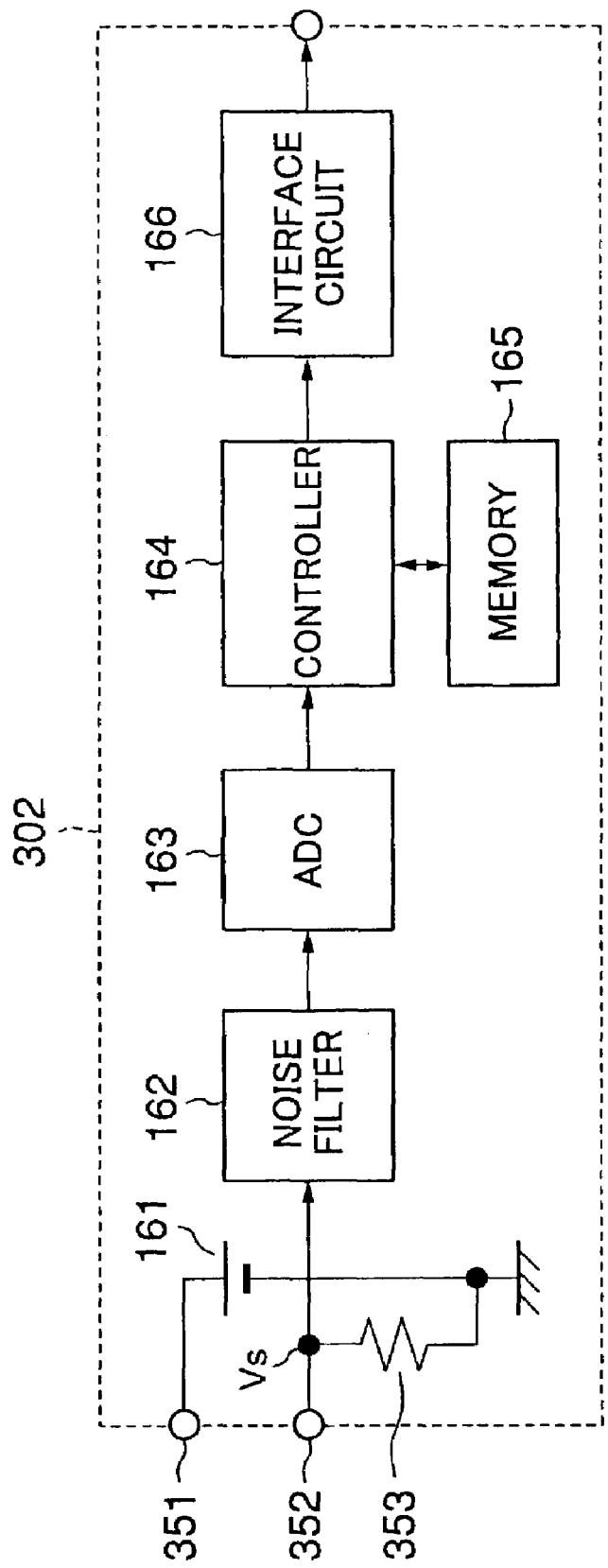
FIG. 15 is a block diagram of a control substrate according to the third embodiment.

FIG. 15 is a block diagram showing the configuration of the control substrate 302. The components in this drawing that are identical to those shown in FIG. 6 are given the same numerical notations and their descriptions are omitted.

The control substrate 302 has a first terminal 351, a second terminal 352, a detection resistor 353, the driving power source 161, the noise filter 162, the analog-to-digital converter 163, the controller 164, the memory 165, and the interface circuit 166. The first terminal 351 of the control substrate 302 is connected to the first terminal 341 of the touch panel 301 via the flexible printed wiring board 303, and the second terminal 352 of the control substrate 302 is connected to the second terminal 342 of the touch panel 301 via the flexible printed wiring board 303.

A driving voltage is applied to the first terminal 351 of the control substrate 302 from the driving power source 161. Also, the second terminal 352 of the control substrate 302 is grounded via the detection resistor 353.

In this way, a predetermined driving voltage is applied between the first conductive film 331 and the second conductive film 332 of the touch panel 301. When the first conductive film 331 and the second conductive film 332 come into contact with the conductive film 152 of the upper substrate 112, an electrical current is supplied to the detection resistor 353 from the first conductive film 331 and the second conductive film 332. As a result, a detection voltage Vs is generated at the detection resistor 353. The detection voltage Vs varies depending on the contact position of the first conductive film 331 and the second conductive film 332. Thus, the coordinates (x, y) can be determined according to the detection voltage Vs.

The detection voltage Vs is supplied to the noise filter 162. The noise filter 162 removes noise components from the detection voltage Vs and supplies the resulting voltage to the analog-to-digital converter 163. Digital data converted at the analog-to-digital converter 163 are supplied to the controller 164. The controller 164 determines the coordinates data Dx and Dy based on the digital data from the analog-to-digital converter 163 by referring to the memory 165, and supplies these coordinates data to the interface circuit 166. The interface circuit 166 sends the above coordinates data Dx and Dy to the connected apparatus.

[Principle of Operation of Input Apparatus 300]

Herein, the width of a side edge portion of the conductive film 122 with respect to the direction Y1 is denoted as C1, the width of a side edge portion of the conductive film 122 with respect to the direction Y2 is denoted as C2, and the diameter of the contact point is denoted as r (see FIG. 12). The diameter r of the contact point is arranged to be:

$$r<P1+P2$$

Also, it is arranged so that the first conductive film 331 and the second conductive film 332 do not come into contact at a plurality of places simultaneously. Also, by implementing the dot spacers 322 on the first conductive film 331 and the second conductive film 332, the first conductive film 331 and the second conductive film 332 both come into contact with the conductive film 152 of the upper substrate 112 even when r<P1+P2.

Also, the resistance corresponds to the width and length of the conductive film. If the width of the first conductive film 331 is denoted as 'a' and the width of the second conductive film 332 is denoted as 'b', the resistance value at the end portion in the direction Y1 is (Y0/a) and the resistance value at the end portion in the direction Y2 is (Y0/b). That is, when the contact point is moved along the directions Y, the resistance may vary within a range of (Y0/a) through (Y0/b). In this way, the coordinate of the Y axis (in directions Y) can be detected.

Herein, the resistance between the first terminal 341 and the second terminal 342 when the first conductive film 331 and the second conductive film 332 touch the conductive film 152 at coordinates (x1, y1) shown in FIG. 12 is denoted as R1, the resistance between the first terminal 341 and the second terminal 342 when the first conductive film 331 and the second conductive film 332 touch the conductive film 152 at coordinates (x2, y2) is denoted as R2, the resistance between the first terminal 341 and the second terminal 342 when the first conductive film 331 and the second conductive film 332 touch the conductive film 152 at coordinates (x3, y3) is denoted as R3, and the resistance between the first terminal 341 and the second terminal 342 when the first conductive film 331 and the second conductive film 332 touch the conductive film 152 at coordinates (x4, y4) is denoted as R4 wherein, x1=x2=(x3−a), y1=y2−Y0=y3.

In this case, the resistance R1 can be expressed as:

$$R1=(x1/C1)+\{(y2-y1)/b\}+(x1/C2) \tag{14}$$

Also, the resistance R1 can be expressed as:

$$R2=(x2/C1)+\{(y2-y1)/a\}+(x2/C2) \tag{15}$$

Further, the resistance R1 can be expressed as:

$$R3=(x3/C1)+\{(y3-y2)/b\}+(x3/C2) \tag{16}$$

In the following, (R1−R2), which is the difference between the resistance R1 of the coordinates (x1, y1) and the resistance R2 of the coordinates (x2, y2), and (R3−R1), which is the difference between the resistance R3 of the coordinates (x3, y3) and the resistance R1 of the coordinates (x1, y1) are contemplated.

The difference between the resistance R1 of the coordinates (x1, y1) and the resistance R2 of the coordinates (x2, y2), namely, ΔR1−2=(R1−R2), is the largest change of the resistance in the directions Y, and based on the formulas (14) and (15) the following formula can be obtained:

$$\Delta R1-2=(R1-R2)=\{(y2-y1)\cdot b\}-\{(y2-y1)\cdot a\} \tag{17}$$

Also, the difference between the resistance R3 of the coordinates (x3, y3) and the resistance R1 of the coordinates (x1, y1), namely, ΔR3−1=(R3−R1), is a change of the resistance in the direction x1 for one step, and based on the formulas (14) and (16) the following formula can be obtained:

$$\Delta R3-1=(R3-R1)=(x3/C1)-(x1/C1) \tag{18}$$

Herein, the coordinates can be unambiguously detected according to the resistance. Thus, compared to (R3−R1) shown in the formula (18), which is the resistance change for one step in the direction X, (R1−R2), which is the largest resistance change shown in the formula (17) in the direction Y, is arranged to be smaller. That is, $$\Delta R3-1>\Delta R1-2 \tag{19}$$

Accordingly, the detection resistance value and the coordinates can be unambiguously determined.

By arranging the width C of the conductive film 122 so that the width of the edge portion of the conductive film 122 in the direction Y1 is C1 and the width of the edge portion of the conductive film 122 in the direction Y2 is C2, the formula (19) can be obtained.

Figure 16A:
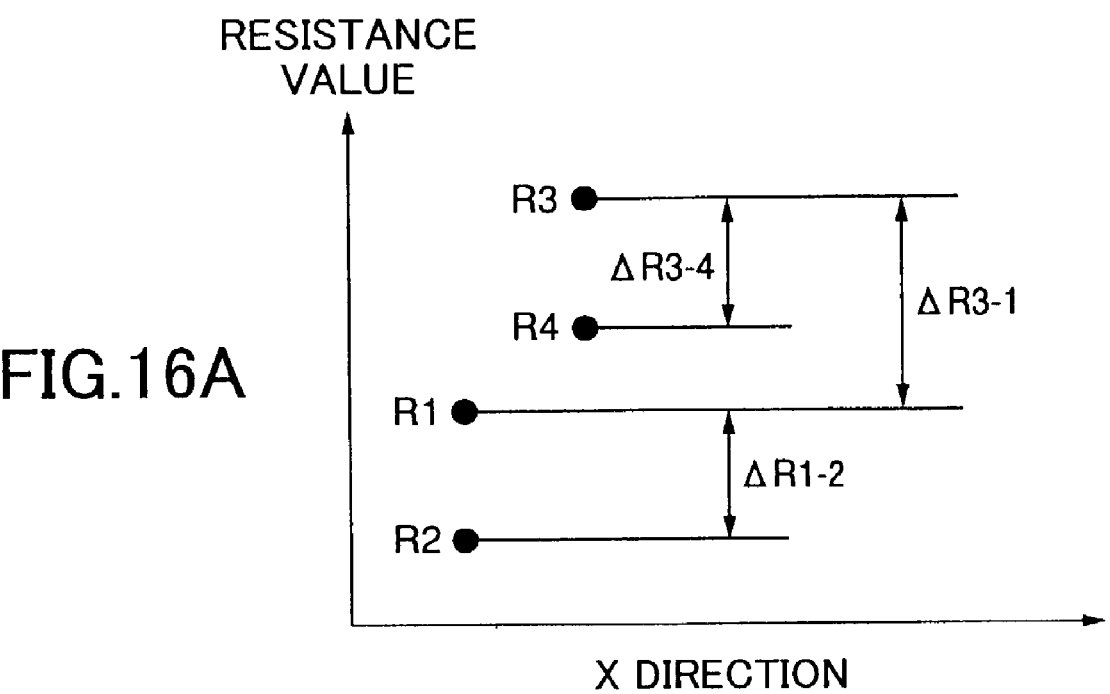
FIGS. 16A and 16B are diagrams for illustrating a method of setting a resistance value.
Figure 16B:
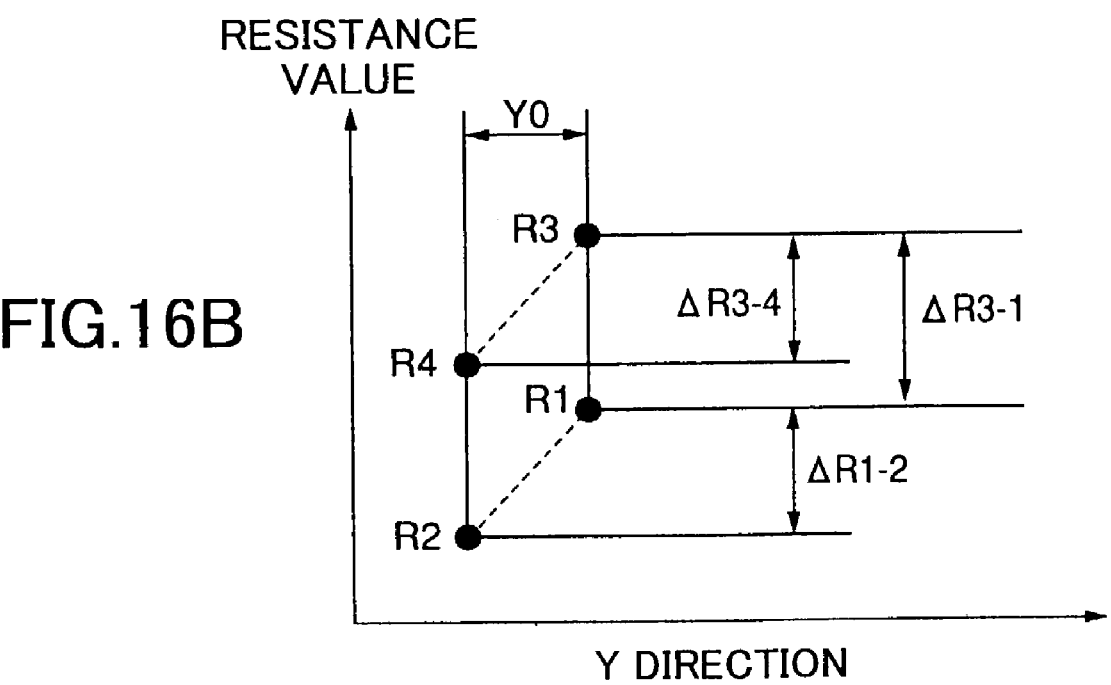

FIGS. 16A and 16B show the method of setting the resistance value. FIG. 16A shows the resistance value in the direction X, and FIG. 16B shows the resistance value in the direction Y.

The drawings in FIGS. 16A and 16B satisfy the conditions indicated by the formula (19). If (R3−R1) is set to be a small value, the difference between resistance R1 and resistance R4 is reduced. As a result, the region from the resistance R1 to resistance R2 and the region from the resistance R3 to resistance R4 overlap, and the coordinates position cannot be unambiguously determined from the resistance.

Thus, the width C1 of the edge portion of the conductive film 122 in the direction Y1 and the width C2 of the edge portion of the conductive film 122 in the direction Y2, as shown in FIG. 12 are adjusted so as to satisfy the conditions of the formula (19).

[Effects]

According to the present embodiment, a parallel electrode structure due to silver ink printing becomes unnecessary, and the structure of the input apparatus can be simplified. Also, the input apparatus can be made thinner. Further, since the connecting terminal is made of three terminals, namely, the power source terminal, the grounding terminal, and the output terminal, the terminal structure can be simplified and reliability can be increased. Additionally, the upper substrate 112 need only connect the first conductive film 331 and the second conductive film 332 by crossing over the narrow slit 321. Thereby, the input apparatus is less likely to be influenced by scratches and other various damage and the life span of the panel can be increased.

[Fourth Embodiment]

Figure 17:
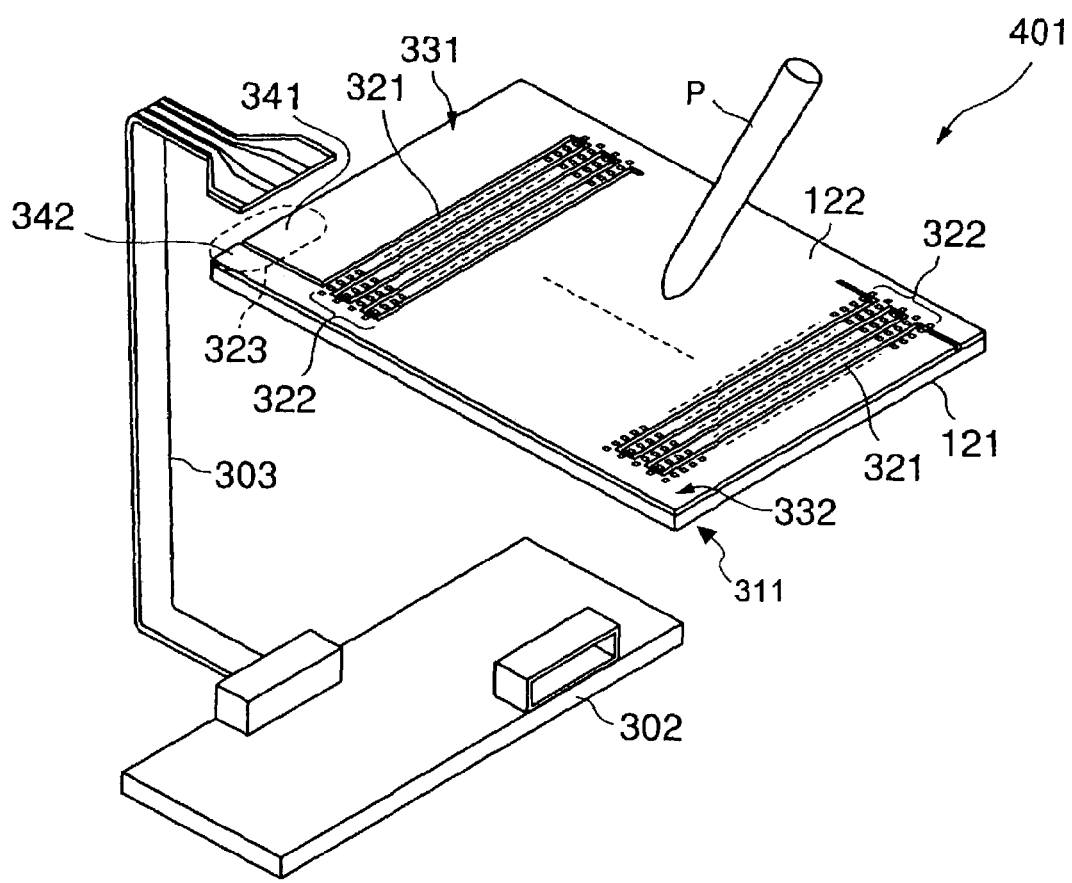
FIG. 17 is a perspective view diagram showing the component parts of an input apparatus according to a fourth embodiment of the present invention.
Figure 18:
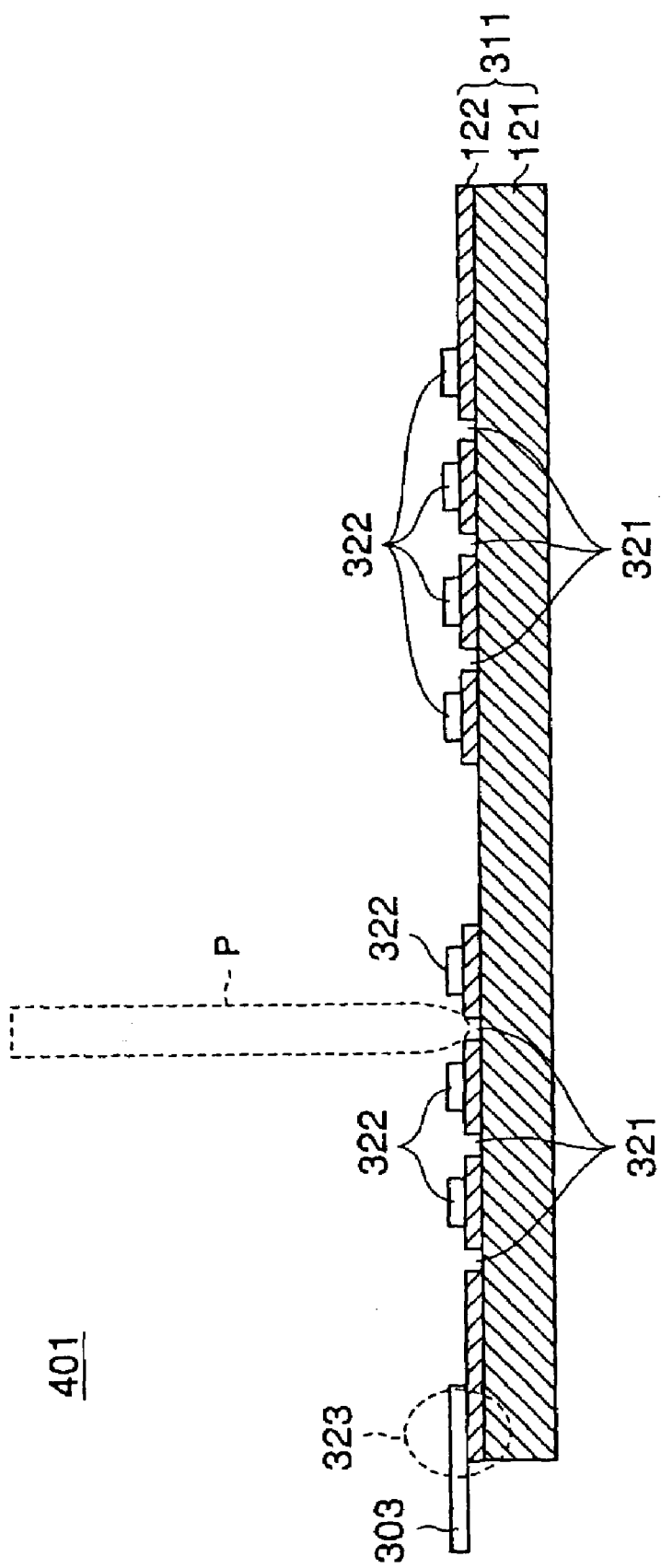
FIG. 18 is a cross sectional view of the input apparatus according to the fourth embodiment.

FIG. 17 is a perspective view diagram of an input apparatus according to a fourth embodiment of the present invention; and FIG. 18 is a cross sectional view of the input apparatus according to the fourth embodiment of the present invention. In these drawings, the components that are identical to those shown in FIGS. 11–13 are given the same numerical notations and their descriptions are omitted.

In an input apparatus 400 according to the present embodiment an input is made using a coordinates pointing pen P instead of the upper substrate 112 of the third embodiment. A touch panel 401 of this embodiment has a configuration that is different from the third embodiment.

The touch panel 401 does not include the upper substrate 112 and the spacer 113 included in the touch panel 301 of the third embodiment.

At least the tip of the coordinates pointing pen P is made of conductive material so that an electric current can be passed on to the first conductive film 331 and the second conductive film 332 upon being placed on the slit 321. Further, the tip of the pen is arranged to have a diameter r of the previously mentioned contact point.

Also, the dot spacer 322 controls the coordinates pointing pen P so that the contact point of the coordinates pointing pen P is placed on the slit 321 when coming into contact with the lower substrate 311.

According to the present embodiment, the upper substrate is unnecessary, thereby further reducing the thickness of the input apparatus. Also, the structure is simplified so that costs can be reduced. [Fifth Embodiment]

Figure 19:
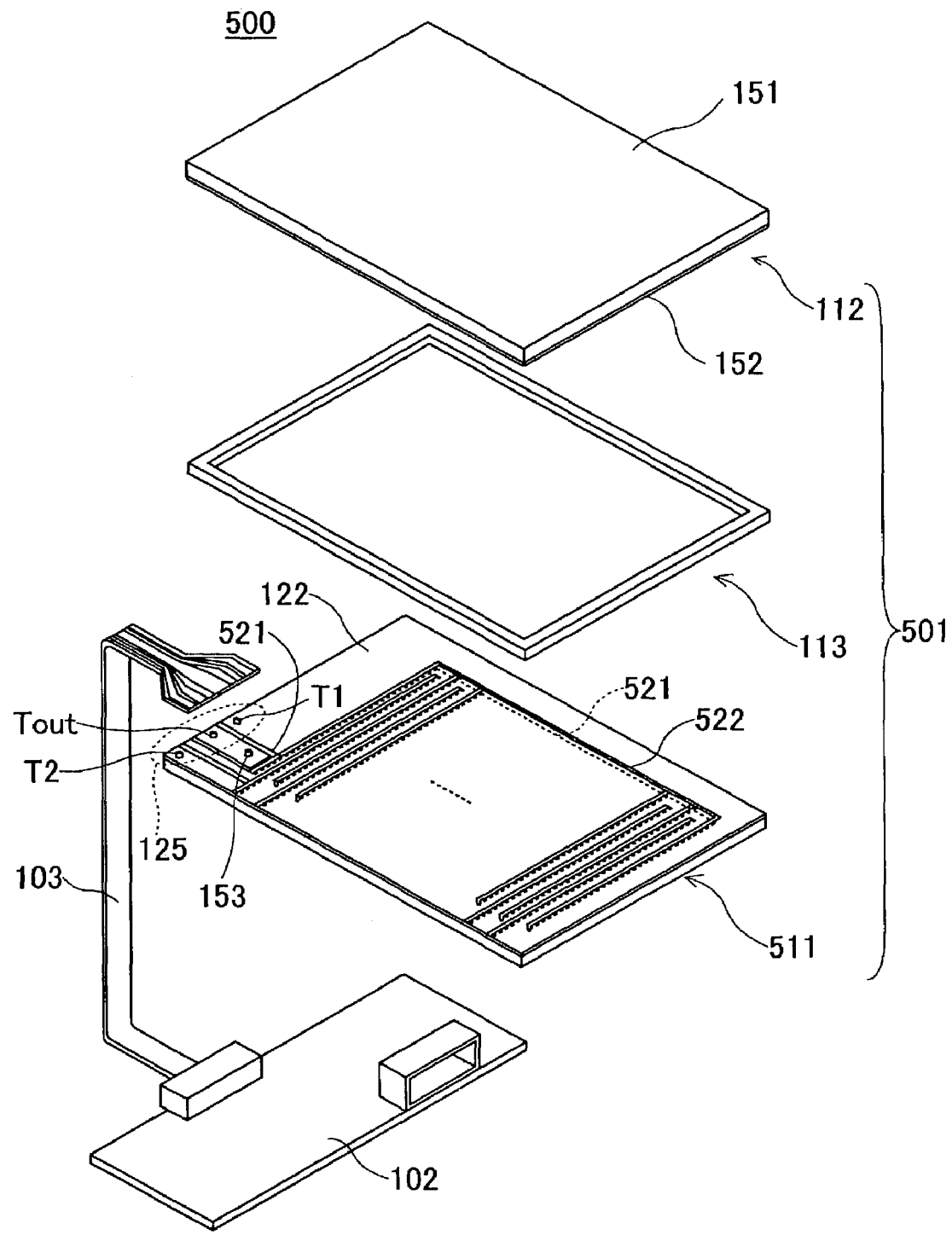
FIG. 19 is a perspective view diagram showing the component parts of an input apparatus according to a fifth embodiment of the present invention.

FIG. 19 is a perspective view of an input apparatus according to a fifth embodiment of the present invention; FIG. 20 is a cross sectional view of this input apparatus; and FIG. 21 is a diagram showing the structure of a lower substrate 511. In these drawings, the components that are identical to those shown in FIGS. 2 and 3 are given the same numerical notations and its descriptions are omitted.

In an input apparatus 500 according to the present invention, the lower substrate 511 of a touch panel 501 has a different configuration from the lower substrate 111 of the first embodiment. The lower substrate 511 of the present invention has slits 521 formed on the conductive film 122. The slits 521 are arranged so that the conductive film 122 is iteratively folded at a predetermined length to form a continuous pattern between a terminal T1 and a terminal T2. The control substrate 102 applies a predetermined voltage to both ends of the continuous pattern formed on the lower substrate 511. The control substrate 102 detects the voltage of the upper substrate 112 when the conductive film 152 of the upper substrate 112 comes into contact with the conductive film 122 of the lower substrate 511, and then determines the contact position of the upper substrate 112 and the lower substrate 511 according to the detected voltage.

According to the present embodiment, a predetermined voltage is applied to both ends of the continuous pattern formed on the lower substrate, thereby, a voltage drop occurs at the above continuous pattern. By detecting the voltage on the above continuous pattern via a conductive film of the upper substrate, the contact position on the continuous pattern can be determined.

Figure 22A:
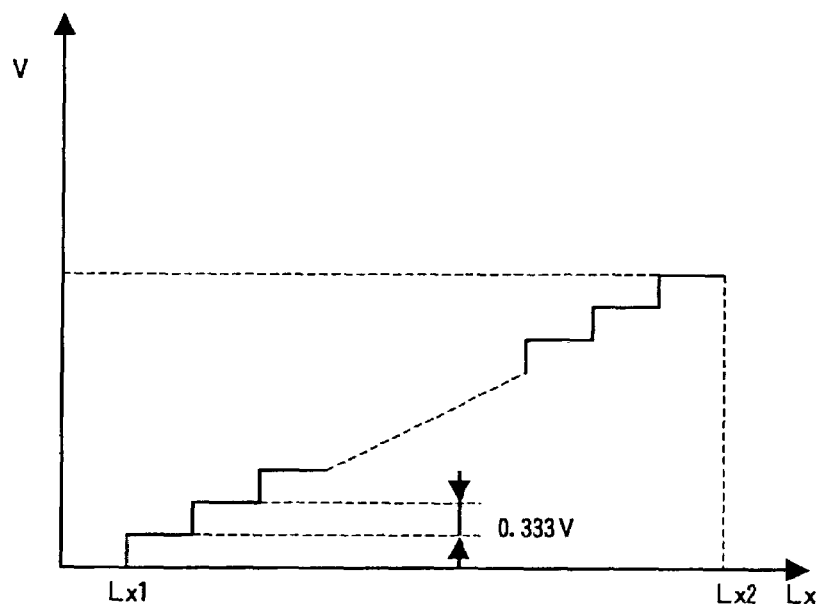
FIGS. 22A and 22B are diagrams illustrating changes of voltage with respect to contact points of a coordinates pointing pen.
Figure 22B:
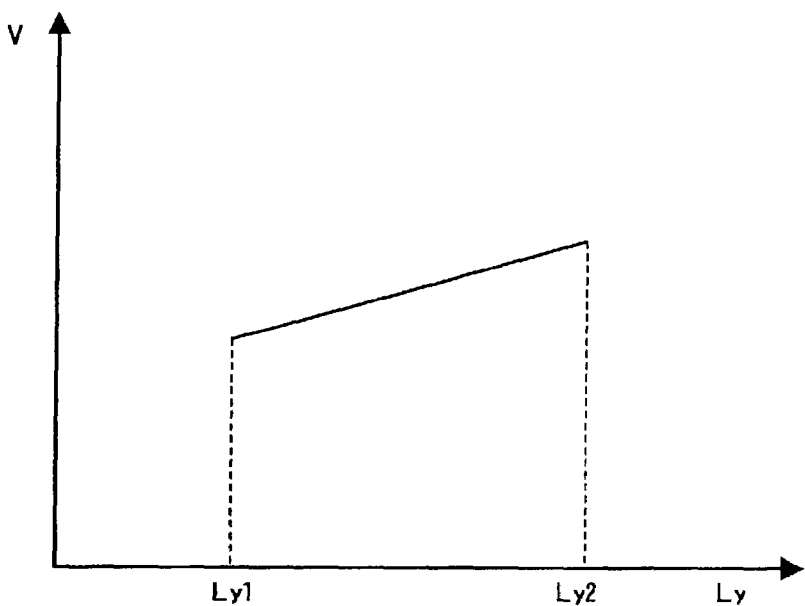

FIGS. 22A and 22B are diagrams showing the change of the voltage with respect to the contact position of the pen P. FIG. 22A shows the voltage change in the direction X, and FIG. 22B shows the voltage change in the direction Y.

According to the present embodiment, the change in the detected voltage Vx in the direction X has a stepped structure corresponding to each folded conductive film layer as shown in FIG. 22A. The detected voltage Vy in the direction Y changes in a linear fashion as shown in FIG. 22B. The output voltage Vout of the terminal Tout is the compounded voltage of the detected voltage Vx in the direction X and the detected voltage Vy in the direction Y, and the contact position can be unambiguously determined based on the output voltage Vout of the terminal Tout.

For example, it is assumed that when 5V is applied to terminal T1 and the terminal T2 is grounded, due to attenuation and the like, 3 V is applied to both terminals of the lower substrate 511 in the direction X. Also, if there are nine lines in the folded slits, the voltage range $\Delta V$ for one line is:

$$\Delta V = 3(V)/9(\text{lines}) \approx 0.333 V$$

The position in the direction X can be detected by the integral multiple of the above value.

Thus, if the detected voltage is denoted as Vs, the position Lx in the direction X can be expressed as:

$$Lx = INT(Vs/0.333) + 1$$

Also, the position Ly in the direction Y can be expressed as the gradient of the line width voltage, namely:

$$Ly = \{Vs - (Lx - 1 \times 0.333 + 1)\}/0.333$$

[Effects]

According to the present invention, a parallel electrode structure from silver ink printing becomes unnecessary, and the structure of the input apparatus can be simplified. Also, the input apparatus can be made thinner. Further, the connecting terminal is made of three terminals, namely, the power source terminal, the grounding terminal, and the output terminal, thereby, the terminal structure can be simplified and reliability can be increased. Also, the life span of the panel can be increased.

[Sixth Embodiment]

Figure 23:
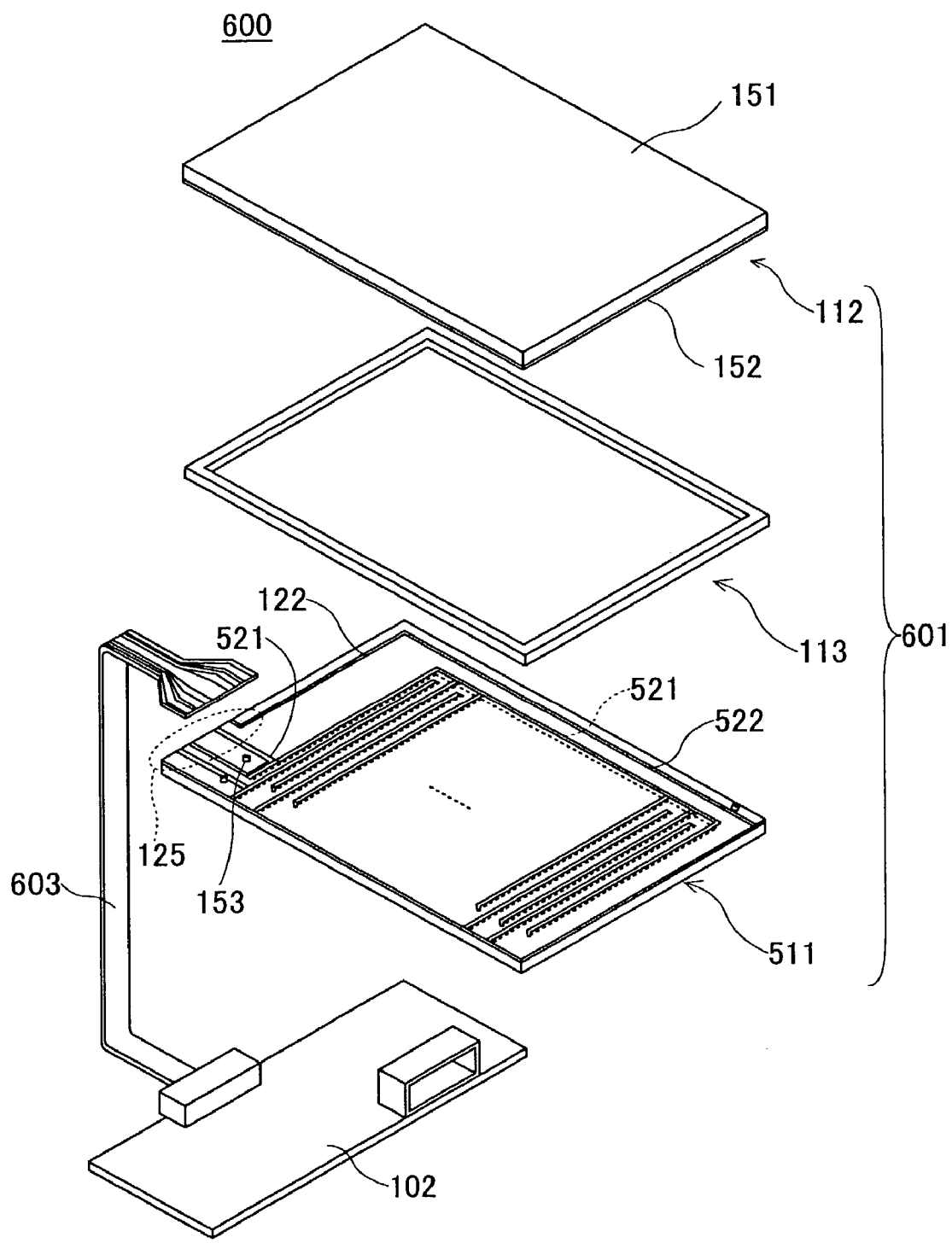
FIG. 23 is a perspective view diagram showing the component parts of an input apparatus according to a sixth embodiment of the present invention.
Figure 24:
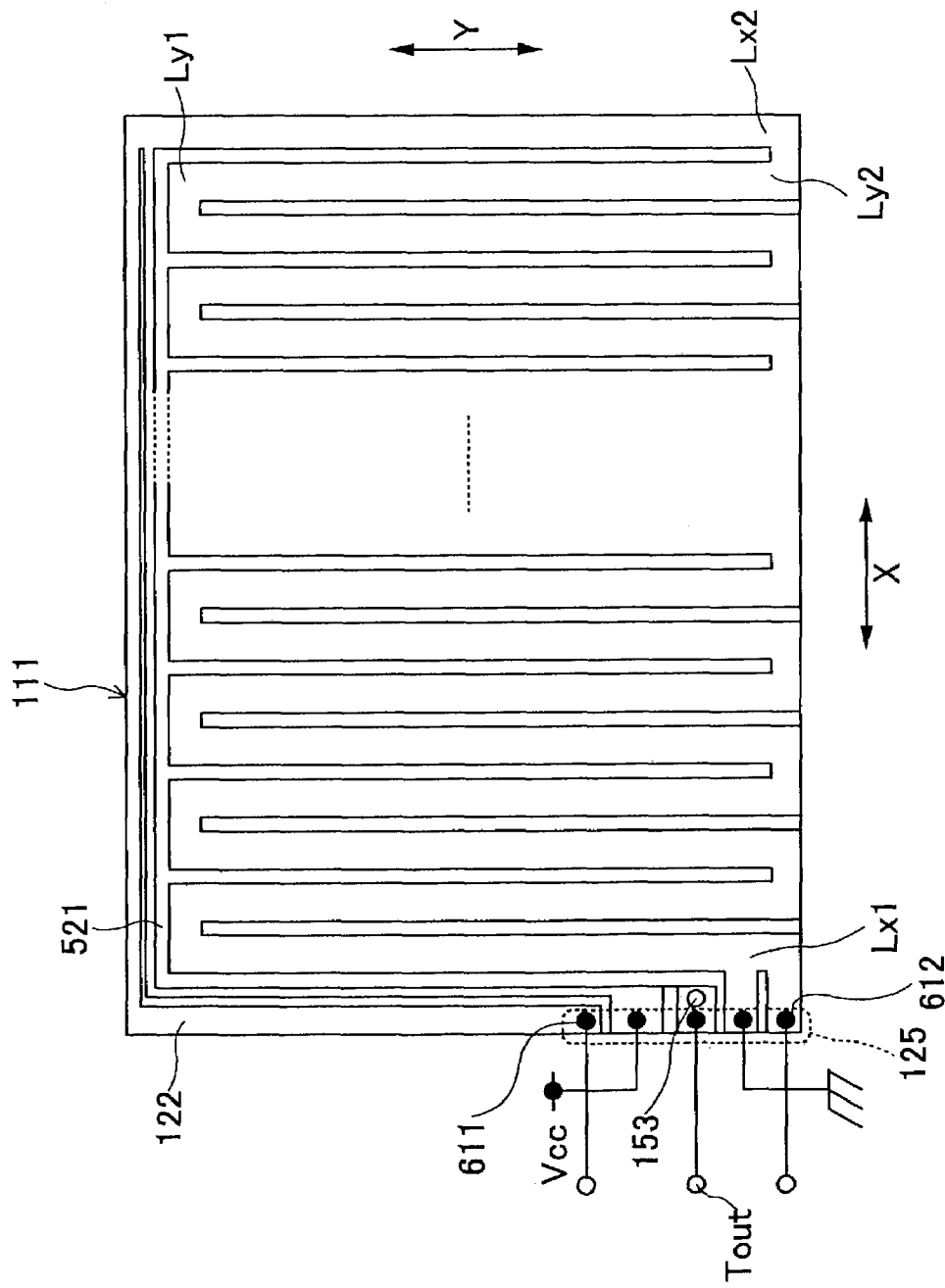
FIG. 24 is a diagram for illustrating the operation of the input apparatus according to the sixth embodiment.

FIG. 23 is a perspective view diagram of an input apparatus according to a sixth embodiment of the present invention; and FIG. 24 illustrates the operation of the input apparatus according to the sixth embodiment of the present invention. In these drawings, the components that are identical to those shown in FIG. 19 are given the same numerical notations and their descriptions are omitted.

In an input apparatus 600 according to the sixth embodiment, a touch panel 601 has a different configuration from the fifth embodiment. The touch panel 601 has monitor electrodes 611 and 612 formed on the lower substrate 511.

The monitor electrodes 611 and 612 are connected to the flexible printed wiring board 603 by the wiring pattern formed on the conductive film 122. The flexible printed wiring board 603 has a wiring pattern for connecting the power source terminal T1 to the control substrate 102, a wiring pattern for connecting the grounding pattern T2 to the control substrate 102, and a wiring pattern for connecting the detection terminal Tout to the control substrate 102, as well as a wiring pattern for connecting the monitor electrode 611 to the control substrate 102 and a wring pattern for connecting the monitor electrode 612 to the control substrate 102. At the control substrate 102, the detection result is corrected based on the voltage between the monitor electrodes 611 and 612.

For example, when the voltage between the monitor electrodes 611 and 612 is larger than the normal voltage applied from the power source, the detected voltage is higher than when the normal voltage is applied. Thus, the detected voltage is lowered. Also, when the voltage between the monitor electrodes 611 and 612 is lower than the normal voltage applied from the power source, the detected voltage is lower than the normal voltage and thus, the detected voltage is raised. The corrected voltage is determined according to a ratio of the normal power source voltage to the voltage between the monitor electrodes 611 and 612.

[Effects]

According to the present invention, the applied voltage is monitored and the detection result is corrected according to the monitored voltage so that the position detection can be accurately performed.

[Seventh Embodiment]

Figure 25:
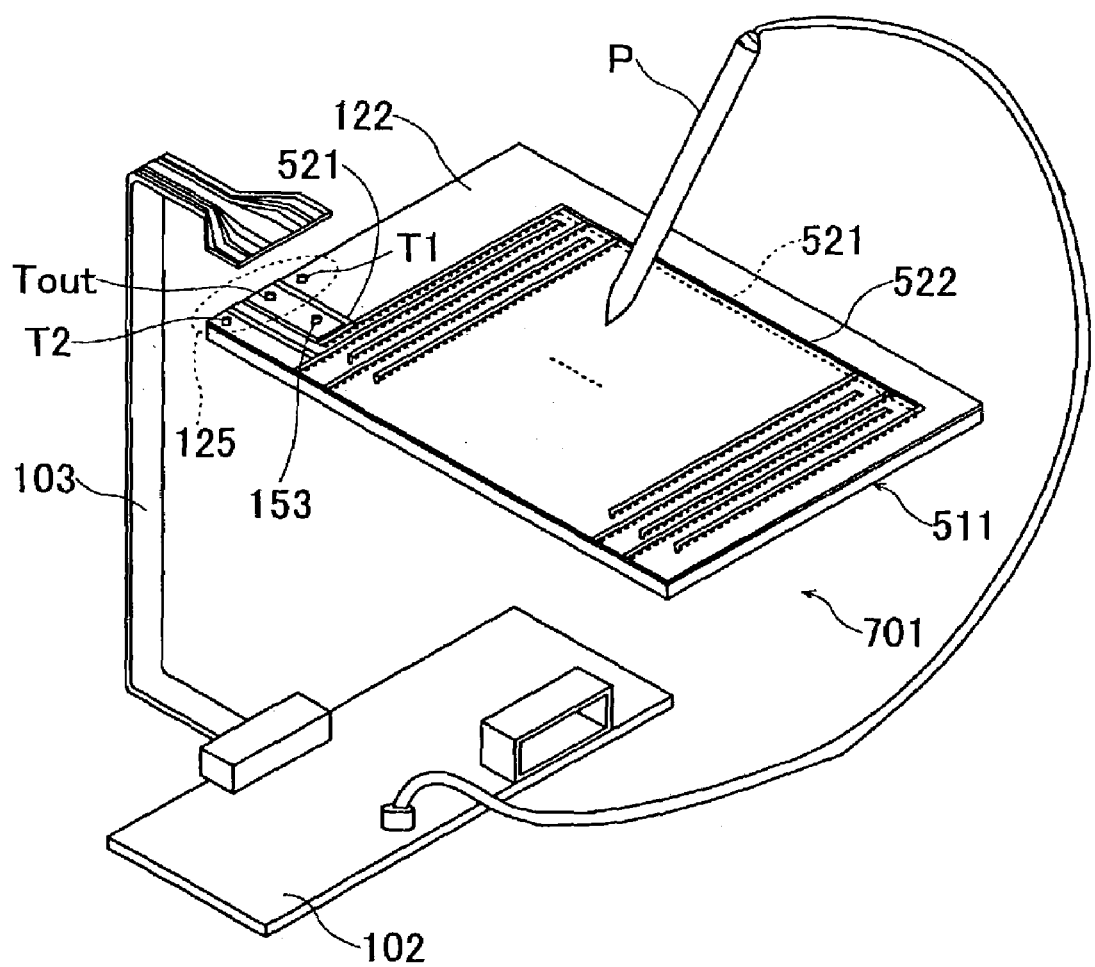
FIG. 25 is a perspective view of an input apparatus according to a seventh embodiment of the present invention.

FIG. 25 is a perspective view diagram of an input apparatus according to a seventh embodiment of the present invention; and FIG. 26 is a cross sectional view of the input apparatus of the seventh embodiment. In these drawings, the components that are identical to those shown in FIGS. 19 and 20 are given the same numerical notations and their descriptions are omitted.

In an input apparatus 700 according to the present embodiment, an input is made using a coordinates pointing pen P instead of the upper substrate 112 of the fifth embodiment, and a touch panel 701 has a different configuration from the fifth embodiment.

The touch panel 701 of the present embodiment does not include the upper substrate 112 and the spacer 113 that are included in the touch panel 501 according to the fifth embodiment.

At least the tip of the coordinates pointing pen P is made of conductive material and is connected to the control substrate 102. The control substrate 102 detects the voltage of the contact position of the coordinates pointing pen P on the conductive film 122, and determines the coordinates position based on the detected voltage.

Also, dot spacers 522 control the position of the coordinates pointing pen P so that when the coordinates pointing pen P touches the lower substrate 511, the contact point does not touch the conductive film on both sides of the slit 521.

According to the present embodiment, in addition to the effects of the fifth embodiment, the input apparatus can be made even thinner since the upper substrate becomes unnecessary. Also, this leads to further cost reduction since the structure of the input apparatus is simplified. This embodiment may also be applied to the input apparatus 600 of the sixth embodiment.

In the following, advantages of the present invention are described.

By forming a plurality of slits in stripes on the conductive film, the contact point between the first substrate and the second substrate or the pointing member can be determined based on the resistance of the conductive film in the extending direction of the slits and the resistance of the conductive film in the direction perpendicular to the slits. Also, since the low resistance parallel conductive patterns formed on the conductive film in the conventional art become unnecessary in the present invention, the structure of the input apparatus is simplified and the number of connecting terminals can be reduced.

Also, by applying a driving voltage between two predetermined points on the conductive film formed on the first substrate and detecting the electric potential of the second substrate or the pointing member, the resistance of the conductive film in the extending direction of the slits and the resistance of the conductive film in the direction perpendicular to the slits can be determined, and thus, the contact point between the first substrate and the second substrate or the pointing member can be determined.

Alternatively, by applying a driving voltage between the second substrate or the pointing member and detecting the electric potential of two predetermined points on the conductive film formed on the first substrate, the resistance of the conductive film in the extending direction of the slits and the resistance of the conductive film in the direction perpendicular to the slits can be determined, and thus, the contact point between the first substrate and the second substrate or the pointing member can be determined.

Further, when the second substrate or the pointing member presses the first substrate, the pressed point is prevented from spreading across the slits and excessively touching the conductive film. In this way, different contact points can be prevented from being simultaneously detected and an accurate contact point can be determined.

Additionally, by arranging the above slits to be nonlinear, the interference of the slits with the scanning line of the display screen of the display apparatus can be prevented.

Also, by setting the resistivity of the conductive film of the second substrate to be lower than the resistivity of the conductive film of the first substrate, the influence from the resistance of the conductive film of the second substrate can be reduced.

Further, by dividing the conductive film of the first substrate into a first conductive film and a second conductive film by a continuous slit and applying a driving voltage between the first conductive film and the second conductive film to detect the electric current in these conductive films, the contact position can be detected based on the resistance value, which varies according to the contact position of the first conductive film and the second conductive film.

Additionally, by iteratively folding the conductive film at a predetermined length to form a continuous pattern on the first substrate, a voltage drop occurs in the continuous pattern upon applying a predetermined voltage at the two ends of the above patterns. Thus, by detecting the voltage drop in the above patterns via the second substrate or the pointing member, the contact position can be determined.

It should be noted that the present invention is not limited to the above-described embodiments, and variations and modifications may be made without departing from the scope of the present invention.

The present application is based on and claims the benefit of the earlier filing date of Japanese priority application No. 2002-230893 filed on Aug. 8, 2002, the entire contents of which are hereby incorporated by reference.

What is claimed is:

1. An input apparatus comprising:
a first substrate having a surface and a first conductive film, comprising a first conductive film portion and a second conductive film portion isolated from each other by a slit formed on the surface;
a second substrate, spaced apart from said first substrate at a fixed distance, having a surface facing the surface of said first substrate on which the first conductive film is formed, said second substrate having a second conductive film formed on the surface thereof facing the first conductive film of said first substrate; and
a detector that applies a driving voltage between said first conductive film portion and said second conductive film portion that are divided by said slit and detects an electric current in said first conductive film portion and said second conductive film portion.

2. The input apparatus as claimed in claim 1, further comprising:
a contact control part that controls said second substrate to deform so that the second conductive film of said second substrate comes into contact with both said first conductive film portion and said second conductive film portion of said first substrate upon pressing said second substrate.

3. An input apparatus, comprising:
a substrate having a conductive film that is divided into a first conductive film and a second conductive film, said first conductive film and said second conductive film being isolated from each other by a slit;
a pointing member that touches said conductive film formed on said substrate; and
a detector that applies a driving voltage between said first conductive film and said second conductive film divided by said slit, and detects an electric current in said first conductive film and said second conductive film.

4. The input apparatus as claimed in claim 3, further comprising:
a contact control part that controls said pointing member so that the pointing member comes into contact with both said first conductive film and said second conductive film of said substrate upon pressing said pointing member to said substrate.

5. An input apparatus, comprising:
a first substrate having a conductive film that is iteratively folded at a predetermined length to form a continuous pattern;
a second substrate having a surface on which a conductive film is evenly formed, said surface of said second substrate with said conductive film facing said first substrate;
a detector that applies a predetermined voltage to two opposite ends of said continuous pattern formed on said first substrate, detects a voltage of said second substrate when the conductive film of said second substrate comes into contact with the conductive film of said first substrate, and determines a contact position between said first substrate and said second substrate according to the detected voltage; and
monitor electrodes arranged at said two ends of said continuous pattern formed on said first substrate, wherein
said detector corrects said detected voltage based on a voltage of said monitor electrodes.

6. An input apparatus, comprising:
a substrate having a conductive film that is iteratively folded at a predetermined length to form a continuous pattern;
a pointing member that touches the conductive film of said substrate and detects a voltage of said conductive film;
a detector that applies a predetermined voltage to two ends of said continuous pattern formed on said first substrate, detects a voltage of said pointing member, and determines a contact position between said pointing member and said substrate according to the detected voltage; and
monitor electrodes arranged at said two ends of said continuous pattern formed on said first substrate, wherein
said detector corrects said detected voltage based on a voltage of said monitor electrodes.

* * * * *